United States Patent
Katsurahira et al.

(10) Patent No.: US 9,600,096 B2
(45) Date of Patent: Mar. 21, 2017

(54) POSITION DETECTING DEVICE AND POSITION DETECTING METHOD

(71) Applicant: Wacom Co., Ltd., Saitama (JP)

(72) Inventors: Yuji Katsurahira, Saitama (JP); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/732,337

(22) Filed: Jun. 5, 2015

(65) Prior Publication Data
US 2016/0077611 A1 Mar. 17, 2016

(30) Foreign Application Priority Data

Sep. 17, 2014 (JP) ................. 2014-188569

(51) Int. Cl.
*G06F 3/0354* (2013.01)
*G06F 3/044* (2006.01)
*G06F 3/041* (2006.01)
*G09G 3/36* (2006.01)

(52) U.S. Cl.
CPC .......... *G06F 3/03545* (2013.01); *G06F 3/044* (2013.01); *G06F 3/0412* (2013.01); *G06F 3/0418* (2013.01); *G09G 3/36* (2013.01); *G06F 2203/04101* (2013.01); *G06F 2203/04106* (2013.01)

(58) Field of Classification Search
CPC .. G06F 3/03545; G06F 3/0412; G06F 3/0418; G06F 3/0416; G06F 3/044; G09G 3/36
USPC ........................................................ 345/179
See application file for complete search history.

(56) References Cited

U.S. PATENT DOCUMENTS

| | | | | |
|---|---|---|---|---|
| 5,798,756 A | * | 8/1998 | Yoshida | G06F 3/0412 178/20.02 |
| 5,854,881 A | * | 12/1998 | Yoshida | G06F 3/0412 178/18.07 |
| 9,046,978 B2 | * | 6/2015 | Katsurahira | G06F 3/0416 |

(Continued)

FOREIGN PATENT DOCUMENTS

| | | |
|---|---|---|
| EP | 2 264 576 A1 | 12/2010 |
| EP | 2 336 853 A2 | 6/2011 |

(Continued)

*Primary Examiner* — Fred Tzeng
(74) *Attorney, Agent, or Firm* — Seed Intellectual Property Law Group LLP

(57) ABSTRACT

A position detecting device includes a sensor having electrodes that receive an alternating current (AC) signal from a capacitive stylus pen that transmits the AC signal. The position detecting device detects a position indicated by the stylus pen on the sensor. The position detecting device also includes: an electrode selection circuit that selects electrodes provided in the sensor for connection to a positive terminal and a negative terminal; a differential amplifier that amplifies and outputs a signal indicating a difference between signals generated at the positive terminal and the negative terminal; a height detector that obtains a height of the stylus pen relative to a sensor surface of the sensor; and a control unit that causes a selection pattern of the electrodes selected for connection to the positive terminal and the negative terminal by the electrode selection circuit to change according to the height obtained by the height detector.

14 Claims, 13 Drawing Sheets

(56) References Cited

U.S. PATENT DOCUMENTS

| | | | | |
|---|---|---|---|---|
| 2006/0262056 A1* | 11/2006 | Masutani | ............ | G06F 3/0412 345/87 |
| 2007/0268272 A1* | 11/2007 | Perski | ............ | G06F 3/044 345/173 |
| 2008/0012835 A1 | 1/2008 | Rimon et al. | | |
| 2008/0170046 A1* | 7/2008 | Rimon | ............ | G06F 3/044 345/174 |
| 2009/0078476 A1 | 3/2009 | Rimon et al. | | |
| 2010/0073323 A1* | 3/2010 | Geaghan | ............ | G06F 3/044 345/174 |
| 2010/0327889 A1* | 12/2010 | Matsubara | ............ | G06F 3/044 324/705 |
| 2012/0050216 A1* | 3/2012 | Kremin | ............ | G06F 3/044 345/174 |
| 2013/0207938 A1* | 8/2013 | Ryshtun | ............ | G06F 3/0416 345/179 |
| 2014/0078101 A1* | 3/2014 | Katsurahira | ............ | G06F 3/044 345/174 |
| 2014/0152602 A1* | 6/2014 | Miyamoto | ............ | G06F 3/0416 345/173 |
| 2015/0277655 A1* | 10/2015 | Kim | ............ | G06F 3/0412 345/174 |
| 2015/0317009 A1* | 11/2015 | Hara | ............ | G01D 9/10 345/173 |

FOREIGN PATENT DOCUMENTS

| | | |
|---|---|---|
| JP | 08-095701 A | 4/1996 |
| JP | 2014-063249 A | 4/2014 |

\* cited by examiner

CIRCUIT EXAMPLE OF STYLUS PEN 50

SIGNAL WAVEFORM OF STYLUS PEN 50

FIG.9
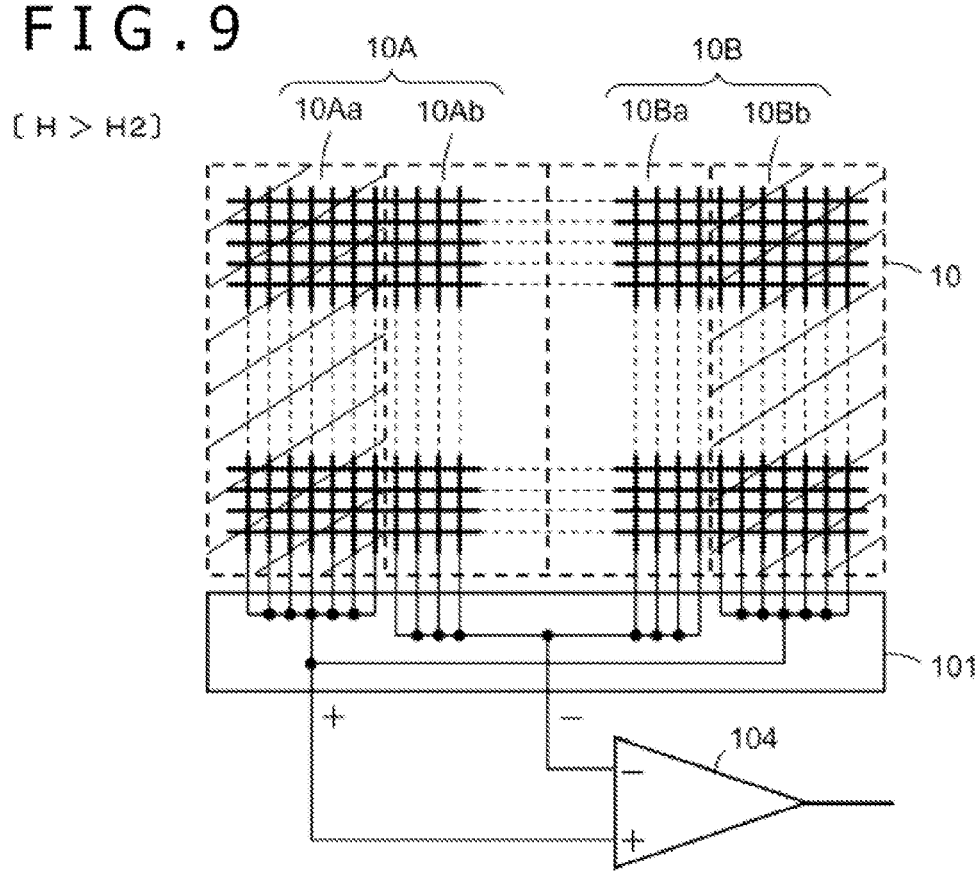
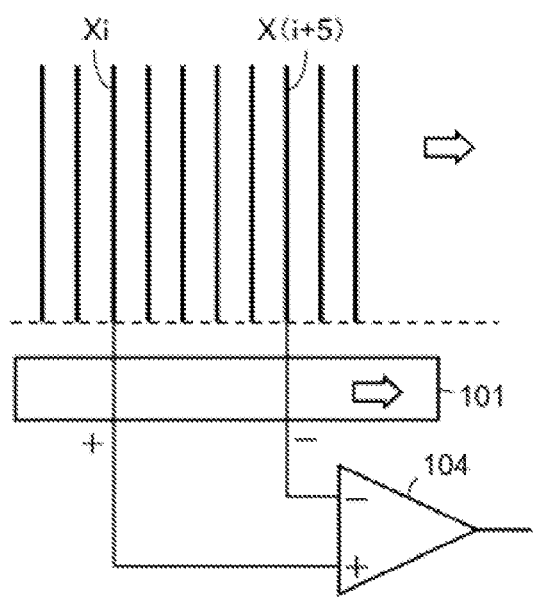
FIG.10A
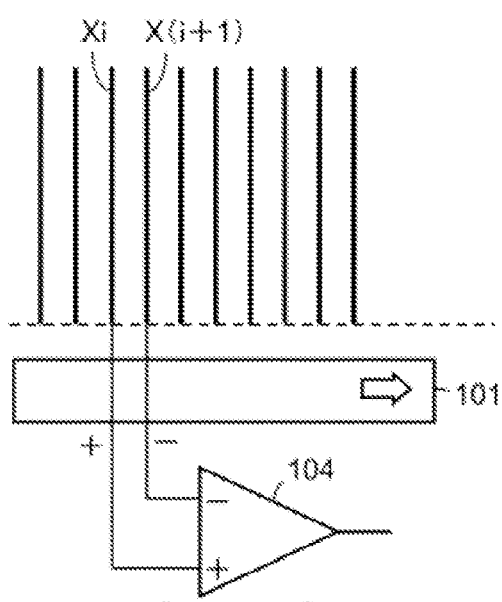
FIG.10B

FIG.11
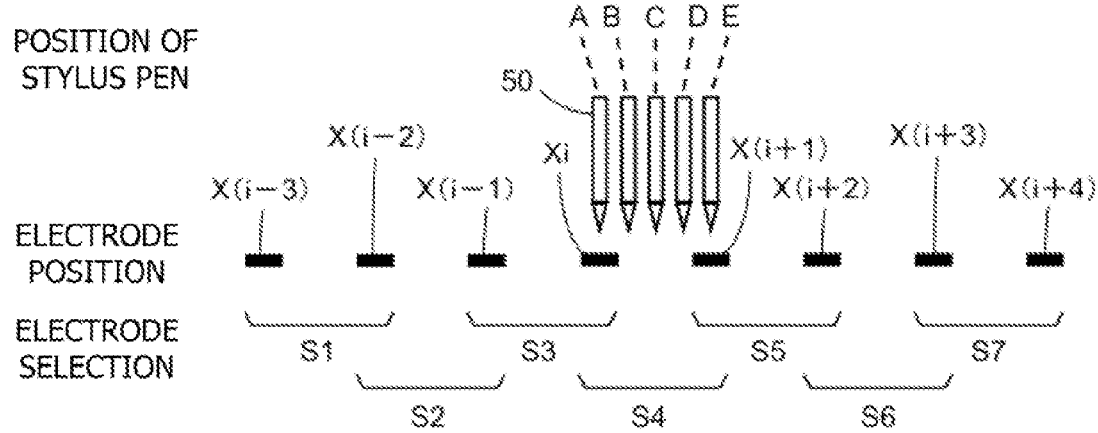
POSITION A
POSITION B
POSITION C
POSITION D
POSITION E

FIG. 14

X-AXIS WHOLE-SURFACE SCAN OPERATION

POSITION DETECTING DEVICE AND POSITION DETECTING METHOD

BACKGROUND

Technical Field

The present disclosure relates to a position detecting device used with a capacitive stylus pen and a position detecting method.

Description of the Related Art

In recent years, as disclosed in Patent Document 1 (Japanese Patent Laid-Open No. 2014-063249) for example, a position detecting device used with a capacitive stylus pen has been provided. The position detecting device disclosed in this Patent Document 1 includes a transparent sensor and this transparent sensor is disposed so as to overlap with a display screen of a display device so that input of handwritten characters and drawing of pictures, illustrations, etc., which are difficult with a finger, can be easily performed through input with a stylus pen.

In this Patent Document 1, the capacitive stylus pen transmits an alternating current (AC) signal to electrodes provided in the sensor of the position detecting device by electric field coupling. Meanwhile, in the position detecting device, the position of the electrode that has received the AC signal from the stylus pen by the electric field coupling is detected and thereby the position indicated on the sensor by the stylus pen is detected.

Furthermore, in the position detecting device disclosed in this Patent Document 1, a multiplexer that selects two electrodes among the plural electrodes provided in the sensor and signals from the two electrodes that are selected by the multiplexer and are separated from each other by a certain distance are amplified by a differential amplifier to eliminate the influence of external noise.

Moreover, in Patent Document 2 (Japanese Patent Laid-Open No. Hei 8-95701), a transparent digitizer serving also as a touch panel is disclosed. This digitizer is configured so as to cancel out noise of a common mode by amplifying signals from two electrodes adjacent to each other by a differential amplifier circuit.

The external noise has the same influence on the two electrodes adjacent to each other. Therefore, if the signals from the adjacent two electrodes are subjected to differential amplification by the differential amplifier circuit as in the digitizer of Patent Document 2, the influence of the external noise can be favorably cancelled.

However, when the stylus pen is separate from the sensor surface by a predetermined distance in the height direction, i.e., is in a so-called hover state, the degrees of electric field coupling with the stylus pen are similar to each other between two electrodes that are located closest to this stylus pen in the hover state and are adjacent to each other. Therefore, when differential amplification is performed on the respective signals generated in these adjacent two electrodes, not only the external noise but also a signal from the stylus pen is cancelled. For this reason, in the case of selecting electrodes adjacent to each other as in the digitizer of Patent Document 2, it might be impossible to favorably detect the stylus pen in the hover state.

In contrast to this, in the position detecting device of the above-described Patent Document 1, two electrodes connected to the positive-side input terminal (non-inverting input terminal) and the negative-side input terminal (inverting input terminal) of a differential amplifier are so selected as to be always separate from each other by a constant distance on the sensor. Thus, a difference is generated in the electric field coupling with the stylus pen in the hover state between the two electrodes as the target of differential amplification processing. Therefore, in the position detecting device of Patent Document 1, external noise can be cancelled by the differential amplification processing and a signal from the stylus pen can be detected. However, because the distance between the selected two electrodes is always set constant, possibly the stylus pen cannot necessarily be favorably detected depending on the degree of the hover state of the stylus pen, i.e., the height of the stylus pen from the sensor.

In addition, in operation of the position detecting device, in some cases, a position is indicated on the sensor with a stylus pen held by a hand in a state in which a finger or hand is in contact with the sensor of the position detecting device. When a hand or finger is in contact with the sensor of the position detecting device as above, external noise often enters the respective electrodes connected to the input terminals of the differential amplifier from the hand or finger.

If the respective electrodes connected to the positive-side input terminal and the negative-side input terminal of the differential amplifier are electrodes that are so selected as to be always separated from each other by a fixed distance as in the position detecting device of Patent Document 1, generally the influence of the entry of external noise due to the contact of a hand or finger is not evenly exerted on both the positive-side input terminal and the negative-side input terminal of the differential amplifier. Therefore, in the position detecting device of Patent Document 1, the influence of the entry of external noise due to the contact of a hand or finger with the sensor cannot be eliminated by the differential amplification processing in some cases. For this reason, a noise signal is superimposed on a signal from the stylus pen and the signal of the stylus pen cannot be successfully detected. Thus, possibly the detection accuracy of the position indicated by the stylus pen significantly deteriorates.

BRIEF SUMMARY

In view of the above-described problems, a position detecting device and a position detecting method are provided such that the position of a stylus pen over a sensor can be favorably detected not only when the stylus pen is indicating a position in contact with the sensor but also when the stylus pen is in a hover state and, even when a hand or finger is in contact with the sensor, the influence of external noise entering from the hand or finger can be eliminated and the position indicated by the stylus pen can be favorably detected.

To solve the above-described problems, a position detecting device is provided that includes a sensor in which a plurality of electrodes that receive by electric field coupling an AC signal from a capacitive stylus pen that transmits the AC signal from a tip. The position detecting device detects a position indicated by the stylus pen on the sensor. The position detecting device includes an electrode selection circuit that selects at least one electrode from the plurality of electrodes provided in the sensor for connection to a positive terminal and that selects at least one electrode from the plurality of electrodes provided in the sensor for connection to a negative terminal, a differential amplifier that amplifies and outputs a signal indicating a difference between signals generated at the positive terminal and the negative terminal, a height detector that obtains a height of the stylus pen from a sensor surface, and a control unit that carries out control to change a selection pattern of the electrodes selected for connection to the positive terminal and the negative terminal by the electrode selection circuit according to the height detected by the height detector.

Furthermore, a position detecting device is provided that includes a sensor in which a plurality of electrodes is disposed in at least a first direction, a differential amplifier circuit that includes a first input terminal and a second input terminal and outputs a differential signal corresponding to signals supplied to the first input terminal and the second input terminal, and an electrode selection circuit that selects electrodes connected to the first input terminal and the second input terminal of the differential amplifier circuit from the plurality of electrodes disposed in the sensor. A position indicated by a stylus pen that generates an electric field based on electric field coupling between the stylus pen and the sensor is detected based on the differential signal output from the differential amplifier circuit. In the position detecting device, if the differential signal output from the differential amplifier circuit corresponding to a first electrode selection pattern set by the electrode selection circuit satisfies a set predetermined condition, a second electrode selection pattern different from the first electrode selection pattern is set by the electrode selection circuit to detect the position indicated by the stylus pen.

Moreover, a position detecting method is provided of a position detecting device including a sensor in which a plurality of electrodes is disposed in at least a first direction, a differential amplifier circuit that includes a first input terminal and a second input terminal and outputs a differential signal based on signals supplied to the first input terminal and the second input terminal, and an electrode selection circuit that selects electrodes connected to the first input terminal and the second input terminal of the differential amplifier circuit from the plurality of electrodes disposed in the sensor. The position detecting device detects a position indicated by a stylus pen that generates an electric field based on electric field coupling between the stylus pen and the sensor based on the differential signal output from the differential amplifier circuit. The position detecting method includes selecting a first electrode to connect to the first input terminal of the differential amplifier circuit, and selecting a second electrode different from the first electrode to connect to the second input terminal of the differential amplifier circuit. A distance between the first electrode and the second electrode is changed based on the differential signal output from the differential amplifier circuit.

With the above-described configurations, the selection pattern of the electrodes connected to the positive-side input terminal and the negative-side input terminal of the differential amplifier circuit is changed by the electrode selection circuit according to the height of the stylus pen from the sensor surface. This allows the optimum electrode selection according to the distance between the stylus pen and the sensor. Thus, position input less susceptible to the influence of external noise is achieved. In addition, a signal from the stylus pen can be favorably received even when the stylus pen exists at a high position from the sensor surface.

According to the present disclosure, selection of the electrodes connected to the positive-side input terminal and the negative-side input terminal of the differential amplifier is dynamically controlled based on the height of the stylus pen relative to the sensor surface. Therefore, with elimination of the influence attributed to the entry of external noise from a hand, finger, or the like, a signal from the stylus can be favorably received even when the stylus moves in a height direction relative to the sensor surface.

BRIEF DESCRIPTION OF THE SEVERAL VIEWS OF THE DRAWINGS

FIG. 9 is a diagram for explaining selection control of electrodes according to a position of a stylus pen in a height direction in a position detecting device according to an embodiment;

FIG. 10A and FIG. 10B are diagrams for explaining selection control of electrodes according to a position of a stylus pen in a height direction in a position detecting device according to an embodiment;

FIG. 11 is a diagram used for explaining a method for detecting a position indicated by a stylus pen in a position detecting device according to an embodiment;

FIG. 14 is a diagram for explaining a processing operation of a position detecting device according to an embodiment;

DETAILED DESCRIPTION

Embodiments of a position detecting device according to the present disclosure will be described below with reference to the drawings.

First Embodiment

Figure 1:
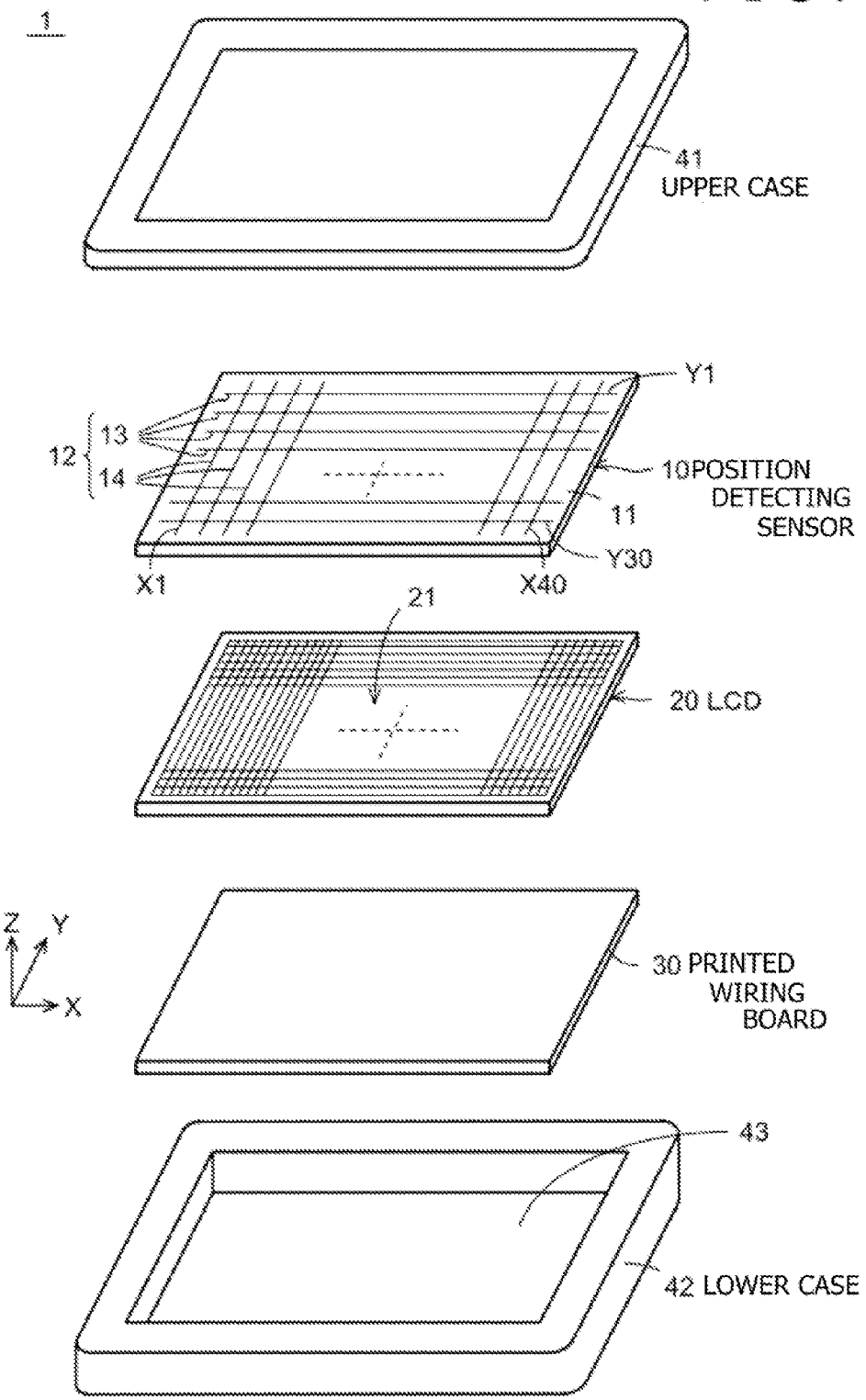
FIG. 1 is an exploded perspective view showing a configuration example of a tablet device that includes a position detecting device according to an embodiment.

FIG. 1 shows an exploded configuration diagram of a tablet device as an example of a position detecting device according to one embodiment.

As shown in FIG. 1, a tablet device 1 of this example is composed of a position detecting sensor 10, a liquid crystal display (LCD) 20 as a display device, a printed wiring board 30, and an upper case 41 and a lower case 42 that form a casing of the tablet device 1. The position detecting sensor 10 is disposed so as to be overlapped over a display surface 21 of this LCD 20.

The position detecting sensor 10 is a transparent sensor in which a transparent electrode group 12 composed of plural electrodes having optical transparency is disposed on a transparent substrate 11. The transparent electrode group 12 is formed of a first transparent electrode group 13 composed of plural, specifically, e.g., 30, transparent electrodes disposed in the Y-axis direction as a first direction and a second transparent electrode group 14 composed of plural, specifically, e.g., 40, transparent electrodes disposed in the X-axis direction as a second direction. Furthermore, the electrodes disposed in the Y-axis direction and the electrodes disposed in the X-axis direction are disposed orthogonally to each other.

In this example, the transparent substrate 11 is formed by bonding two glass plates to each other. The first transparent electrode group 13 is formed on the glass plate on the side opposite to the surface to which an indication is input by a stylus pen (on the side of the surface opposed to the display surface 21 of the LCD 20), of the two glass plates. The second transparent electrode group 14 is formed on the indication input surface side (on the side opposite to the surface opposed to the display surface 21 of the LCD 20).

The first transparent electrode group 13 is composed of 30 first transparent electrodes Y1 to Y30 that are disposed at equal intervals in the Y-axis direction and each have an elongated line shape. The second transparent electrode group 14 is composed of 40 second transparent electrodes X1 to X40 that are disposed at equal intervals in the X-axis direction and each have an elongated line shape. These first transparent electrodes Y1 to Y30 and second transparent electrodes X1 to X40 are formed of an electrically-conductive material having optical transparency, specifically, e.g., a conductor formed of an indium tin oxide (ITO) film.

Therefore, the transparent electrode group 12 has an electrode arrangement in which the 30 first transparent electrodes (hereinafter, referred to as the Y-electrodes) Y1 to Y30 and the 40 second transparent electrodes (hereinafter, referred to as the X-electrodes) X1 to X40 are disposed orthogonally to each other in a lattice manner. In this example, the two glass plates forming the transparent substrate 11 are disposed so that the surfaces of the ITO film face each other, and are bonded to each other with the intermediary of a transparent insulating sheet.

On the printed wiring board 30, electronic parts forming an electronic circuit for processing a signal from the position detecting sensor 10, a drive circuit for driving the LCD panel 20, and so forth are mounted.

The upper case 41 and the lower case 42 forming the casing of the tablet device 1 are each formed of, e.g., a synthetic resin. In the lower case 42 of this casing, a recess 43 for housing the transparent substrate 11, on which the position detecting sensor 10 is provided, the LCD panel 20, and the printed wiring board 30 is formed. In this recess 43, the transparent substrate 11, on which the position detecting sensor 10 is provided, the LCD panel 20, and the printed wiring board 30 are housed. Then, the upper case 41 is bonded to the lower case 42 by an adhesive. Thereby, the recess 43 is sealed and the tablet device 1 is assembled.

Figure 2:
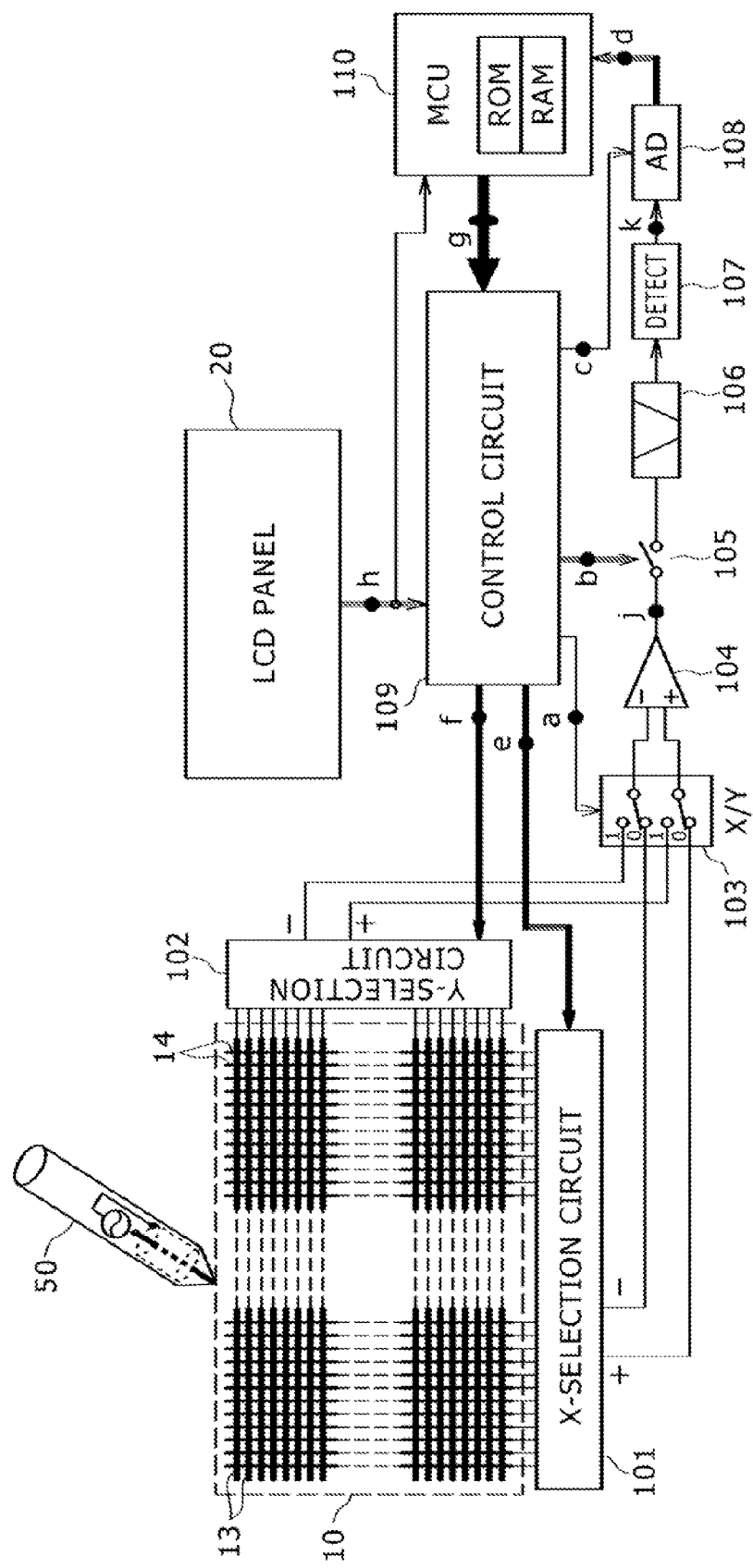
FIG. 2 is a block diagram showing a configuration example of a position detecting device according to an embodiment.

The transparent substrate 11, on which the first transparent electrode group 13 and the second transparent electrode group 14 are disposed, and the printed wiring board 30 include a processing circuit having a configuration shown in FIG. 2 in order to process a signal from the position detecting sensor 10.

FIG. 2 is a configuration diagram of the embodiment of a position detecting device according to the present disclosure. As shown in FIG. 2, the position detecting device of this embodiment includes, in addition to the position detecting sensor 10, an X-selection circuit 101, a Y-selection circuit 102, a switching circuit 103, a differential amplifier 104, a switch 105, a band-pass filter circuit 106, a detection circuit 107, an analog-digital conversion circuit (hereinafter, abbreviated as the AD conversion circuit) 108, a control circuit 109, and a microprocessor (MCU) 110.

The microprocessor 110 includes a read only memory (ROM) and a random access memory (RAM) inside and operates by a program stored in the ROM. Furthermore, the microprocessor 110 outputs a control signal g to the control circuit 109 on the basis of the program stored in the ROM and thereby the control circuit 109 outputs control signals a, b, c, e, and f at predetermined timings.

The position detecting sensor 10 receives a signal from a stylus pen 50. The stylus pen 50 generates an electric field through supply of a signal with a predetermined frequency between an electrode at a pen tip part and a peripheral electrode surrounding it.

The X-selection circuit 101 is connected to the X-electrode group 14 of the position detecting sensor 10 and selects one pair of X-electrodes from the X-electrode group 14 in order to connect the X-electrodes to the positive-side input terminal and the negative-side input terminal of the differential amplifier 104. The Y-selection circuit 102 is connected to the Y-electrode group 13 of the position detecting sensor and selects one pair of Y-electrodes from the Y-electrode group 13 in order to connect the Y-electrodes to the positive-side input terminal and the negative-side input terminal of the differential amplifier 104.

Each of the one pair of X-electrodes selected by the X-selection circuit 101 and the one pair of Y-electrodes selected by the Y-selection circuit 102 is connected to the switching circuit 103. The switching circuit 103 selectively connects the one pair of X-electrodes selected by the X-selection circuit 101 and the one pair of Y-electrodes selected by the Y-selection circuit 102 to the differential amplifier 104. Specifically, when the X-coordinate of a position indicated by the stylus pen 50 is obtained, the control signal a from the control circuit 109 is set to a low level "0" to select the X-selection circuit 101. Furthermore, when the Y-coordinate of a position indicated by the stylus pen 50 is obtained, the control signal a is set to a high level "1" to select the Y-selection circuit 102. In this case, one electrode of the one pair of electrodes selected by the X-selection circuit 101 or the Y-selection circuit 102 is connected to the non-inverting input terminal (positive-side input terminal) of the differential amplifier 104. Meanwhile, the other electrode of the one pair of electrodes selected by the X-selection circuit 101 or the Y-selection circuit 102 is connected to the inverting input terminal (negative-side input terminal) of the differential amplifier 104.

The band-pass filter circuit 106 has a predetermined bandwidth centered at the frequency possessed by a signal output by the stylus pen 50. To this band-pass filter circuit 106, an output signal j from the differential amplifier 104 is supplied via the switch 105.

The switch 105 is controlled to an on-state or an off-state by the control signal b from the control circuit 109. Specifically, when the control signal b is at a high level "1," the switch 105 is set to the on-state and the output signal j from the differential amplifier 104 is supplied to the band-pass filter circuit 106. When the control signal b is at a low level "0," the switch 105 is set to the off-state and thus the output signal j from the differential amplifier 104 is not supplied to the band-pass filter circuit 106.

An output signal of the band-pass filter circuit 106 is detected by the detection circuit 107 and the detection circuit 107 generates a detection signal k. The detection signal k is converted to a digital value by the AD conversion circuit 108 on the basis of the control signal c from the control circuit 109. A digital signal d from this AD conversion circuit 108 is supplied to the microprocessor 110 and processed. The period during which the switch 105 is in the on-state is a reception period in which sampling and conversion to the digital signal d are carried out in the AD conversion circuit 108. The period during which the switch 105 is in the off-state is a reception-stop period in which sampling is not carried out in the AD conversion circuit 108. The reception period and the reception-stop period are alternately set corresponding to the on-state and off-state of the switch 105.

The control circuit 109 supplies the control signal e to the X-selection circuit 101 and thereby the X-selection circuit 101 selects one pair of X-electrodes. Furthermore, the control circuit 109 supplies the control signal f to the Y-selection circuit 102 and thereby the Y-selection circuit 102 selects one pair of Y-electrodes.

Figure 3:
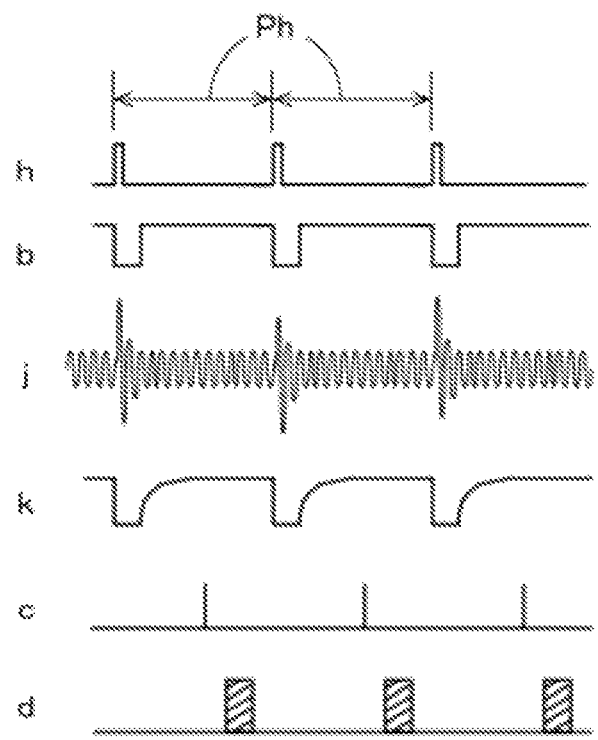
FIG. 3 is a timing chart for explaining the embodiment of the position detecting device of FIG. 2.

In the present embodiment, a horizontal synchronizing pulse h synchronizing with the refresh timing of displaying is supplied from the LCD panel 20 to the control circuit 109 and the microprocessor 110, and the operation of the whole of the position detecting device is carried out in synchronization with a cycle Ph of the horizontal synchronizing pulse h (see FIG. 3).

FIG. 3 shows the waveform of a signal received by the position detecting device from the stylus pen 50 and the timing of an AD conversion operation in a state in which the X-selection circuit 101 and the Y-selection circuit 102 have selected electrodes close to the stylus pen 50. In FIG. 3, h, b, j, k, c, and d show signal waveforms at places shown by the same symbols in FIG. 2.

The signal transmitted from the stylus pen 50 appears in the output signal j from the differential amplifier 104. At the timing of the horizontal synchronizing pulse h, strong noise from the LCD panel 20 is superimposed on the output signal j. In the present embodiment, not only differential amplification processing in the differential amplifier 104 but also switching control of the switch 105 is carried out. Thereby, signal detection (AD conversion) is carried out with avoidance of the generation timing of this noise from the LCD panel 20.

Specifically, on the basis of the horizontal synchronizing pulse h from the LCD panel 20, the control circuit 109 synchronizes with this horizontal synchronizing pulse h and generates the control signal b that is set to the low level during a period including the pulse width period of this horizontal synchronizing pulse h. Then, by this control signal b, the control circuit 109 turns off the switch 105 at the timing synchronizing with the horizontal synchronizing pulse h and during the period including the pulse width period of the horizontal synchronizing pulse h. This prevents the noise appearing in the output of the differential amplifier 104 from being input to the band-pass filter circuit 106 and thus the digital signal d as the conversion result by the AD conversion circuit 108 is not affected by the noise.

The noise generated from the LCD panel 20 is generally pulsive noise. If such pulsive noise is input to the band-pass filter circuit 106, the influence remains over a long time even after the end of the pulse. Therefore, in the present embodiment, during the period when the noise generated from the LCD panel 20 appears, the output signal j from the differential amplifier 104 is controlled by the switch 105 so as not to be input to the band-pass filter circuit 106. Therefore, the signal waveform of the detection signal k output from the detection circuit 107 results from elimination of the influence of the noise generated from the LCD panel 20. The control signal c that is output from the control circuit 109 and synchronizes with the horizontal synchronizing pulse h is supplied to the AD conversion circuit 108 and the detection signal k output from the detection circuit 107 is converted to the digital signal d. The digital signal d is supplied to the microprocessor 110 and predetermined signal processing for detecting the position indicated on the position detecting sensor 10 by the stylus pen 50 is executed.

Figure 4:
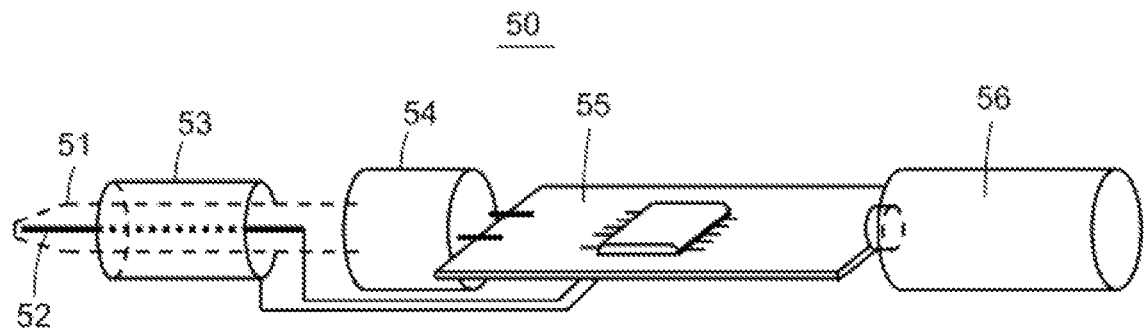
FIG. 4 is a diagram showing a configuration example of a stylus pen used with a position detecting device according to an embodiment.

FIG. 4 shows an internal structure example of the stylus pen 50 used in the present embodiment. In FIG. 4, a core body 51 is provided at the pen tip part of the stylus pen 50 and an electrode 52 is buried inside the core body 51. A shield electrode 53 is provided so as to surround the core body 51 at the outer circumference of the core body 51 excluding the tip part. The shield electrode 53 is connected to a part (GND; ground electrode) at which the potential is the most stable in the circuit. This shield electrode 53 has an effect of preventing the deviation of a detected coordinate value even when the stylus pen 50 is put on the surface of the position detecting sensor 10 with a tilt.

The stylus pen 50 of this example includes a writing pressure detector that detects the pressure (writing pressure) applied to the core body 51. In this example, the writing pressure detector is formed of a variable-capacitance capacitor 54 that is physically coupled to the core body 51 and changes in the capacitance depending on the writing pressure applied via the core body 51. Each terminal of this variable-capacitance capacitor 54 is connected to a printed wiring board 55. An oscillation circuit 58 that oscillates at a predetermined frequency is provided on this printed wiring board 55 and its oscillation output is supplied to the electrode 52. A driving voltage is supplied from a power supply such as a battery 56 to a circuit part formed on the printed wiring board 55.

In the circuit part formed on the printed wiring board 55, the writing pressure applied to the variable-capacitance capacitor 54 is turned into a binary code by an operation to be described later and an amplitude shift keying (ASK)-modulated signal is output by controlling the oscillation circuit 58. An ASK modulation circuit for this purpose is also provided on the printed wiring board 55.

Figure 5:
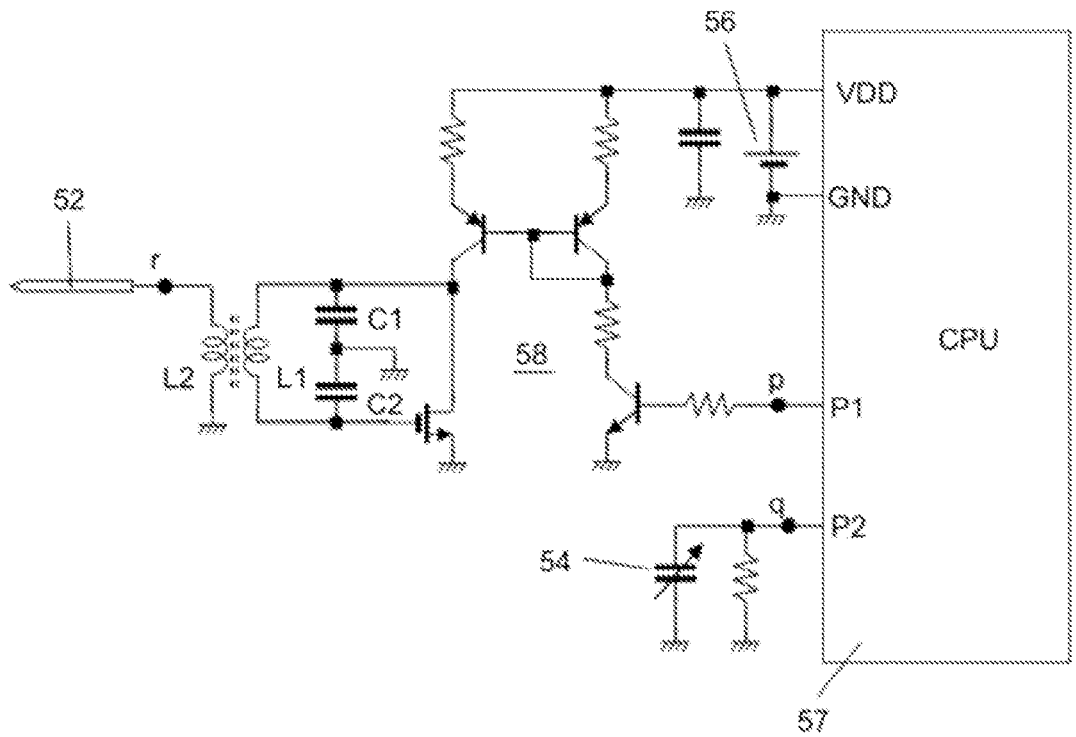
FIG. 5 is a diagram showing an internal circuit example of the stylus pen of FIG. 4.

FIG. 5 shows one example of circuitry included in the stylus pen 50. In FIG. 5, the same component as the component in FIG. 4 is represented by the same symbol. In FIG. 5, a coil L1, a capacitor C1, and a capacitor C2 form part of the oscillation circuit 58 and the oscillation output thereof is induced to a coil L2 coupled to the coil L1 and is supplied to the electrode 52 of the core body 51.

In FIG. 5, a central processing unit (CPU) 57 operates in accordance with a predetermined program. A control signal p from a terminal P1 of the CPU 57 is connected to the above-described oscillation circuit 58 and controls the oscillation so that the oscillation may be in an activated state or a stopped state. For example, the oscillation circuit 58 stops the oscillation when the control signal p is at a low level "0" and carries out the oscillation when the control signal p is at a high level "1." The variable-capacitance capacitor 54 is connected in parallel to a resistor and is connected to a terminal P2 of the CPU 57. With a definition that a signal of this terminal P2 is q and a signal supplied to the electrode 52 of the core body 51 is r and a signal of the terminal P1 (control signal) is p, the operation of the stylus pen 50 will be described.

Figure 6:
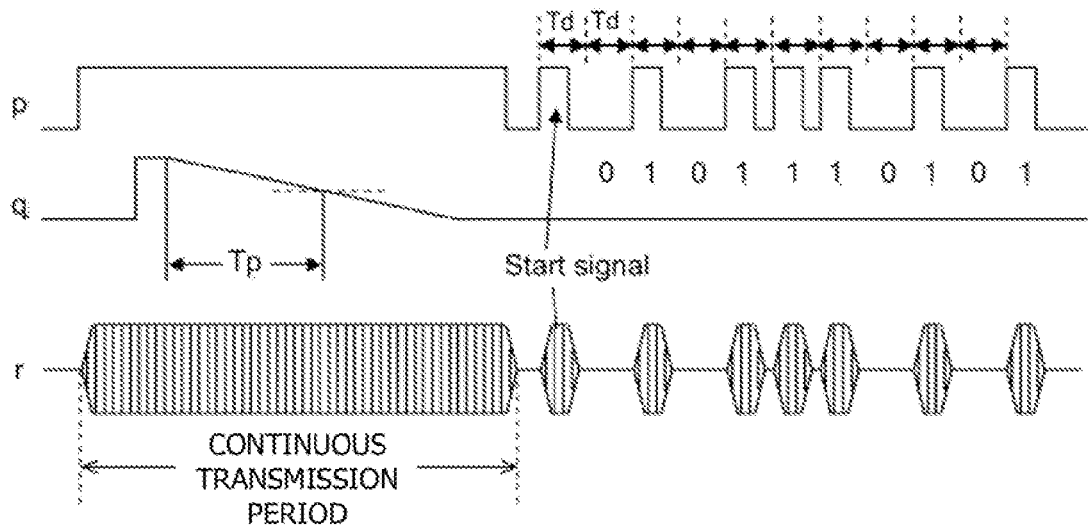
FIG. 6 is a diagram for explaining a processing operation of the stylus pen of FIG. 4.

FIG. 6 shows the respective waveforms of the signals p, q, and r in FIG. 5. The CPU 57 outputs the high level "1" as the control signal p to continue the operation of the oscillation circuit for a predetermined period. The position detecting device carries out operation of detecting a position indicated by the stylus pen 50 to be described later in this period. Furthermore, the CPU 57 carries out writing pressure detection by the variable-capacitance capacitor 54 in the period of continuous transmission of the oscillation signal, during which this control signal p is set to the high level "1." To carry out this writing pressure detection, the CPU 57 sets the terminal P2 to the high level "1" after starting the above-described continuous transmission of the oscillation signal. This causes the signal q to be set to the high level "1" and the variable-capacitance capacitor 54 is charged by a predetermined voltage, specifically, e.g., the voltage of the battery 56.

Upon completion of this charging, the CPU 57 sets the terminal P2 to a high-impedance state. Thereby, the charge accumulated in the variable-capacitance capacitor 54 is discharged by the resistor connected in parallel to the variable-capacitance capacitor 54 and therefore the voltage of the signal q, i.e., the terminal P2, gradually decreases. When the voltage of the terminal P2 becomes a predetermined threshold voltage or lower in the CPU 57, the internal logic becomes the low level. The CPU 57 measures, as Tp (see FIG. 6), the time from the switching of the terminal P2 to the high-impedance state to the reaching of the voltage of the terminal P2 to the threshold or lower. This time Tp changes depending on the capacitance of the variable-capacitance capacitor 54, i.e., the magnitude of the writing pressure. Therefore, the CPU 57 obtains the time Tp measured in the range from the zero writing pressure to the maximum writing pressure as, e.g., a 10-bit digital value.

A little while after the end of the above-described period of continuous transmission of the oscillation signal, the CPU 57 carries out ASK modulation by controlling the terminal P1 according to this 10-bit writing pressure data. Specifically, the CPU 57 sets the terminal P1 to the low level when the data is "0" and sets it to the high level when the data is "1." In FIG. 6, a start signal as the first data is sent out as "1" invariably. The purpose of this is to enable the microprocessor 110 to accurately grasp the timing of subsequent data. Furthermore, in FIG. 6, a cycle Td is a cycle at which one-bit data is sent out. It is preferable for this cycle Td to be sufficiently longer than the cycle Ph of the horizontal synchronizing pulse h of the LCD panel 20.

An output signal from the position detecting sensor 10 is converted to the digital signal d by the AD conversion circuit 108 on the basis of the control signal c, which synchronizes with the horizontal synchronizing pulse h having a cycle sufficiently shorter than the cycle Td. Furthermore, as shown in FIG. 3, by the control signal b generated in synchronization with the horizontal synchronizing pulse h, the switch 105 is set to the off-state and the reception-stop period is set during the period in which noise generated in synchronization with the horizontal synchronizing pulse h is included. In the reception period, during which the switch 105 is set to the on-state, conversion to the digital signal d is carried out in the AD conversion circuit 108 on the basis of the control signal c. Therefore, as described above, the noise generated in synchronization with the horizontal synchronizing pulse h is not supplied to the AD conversion circuit 108 and thus the influence of the noise is eliminated.

Next, a description will be made about how the position detecting device of the present embodiment configured in the above-described manner detects the position of the stylus pen 50 in a hover state and a position indicated on the position detecting sensor 10 by the stylus pen 50.

When the stylus pen 50 is disposed over the sensor surface of the position detecting sensor 10 (in the hover state), electrode selection control is carried out corresponding to the position of the stylus pen 50 in the height direction relative to the sensor surface of the position detecting sensor 10 to be described later, i.e., the distance (hereinafter, referred to as the "height") from the sensor surface of the position detecting sensor 10. This causes the signal level of the signal output from the differential amplifier 104 to exhibit signal intensity according to the height of the stylus pen 50 from the sensor surface of the position detecting sensor 10. In the position detecting device of this embodiment, data of the signal intensity according to the height of the stylus pen 50 from the sensor surface of the position detecting sensor 10, i.e., data that should be compared with the digital signal d from the AD conversion circuit 108, is stored in the ROM of the microprocessor 110 in advance.

Figure 7:
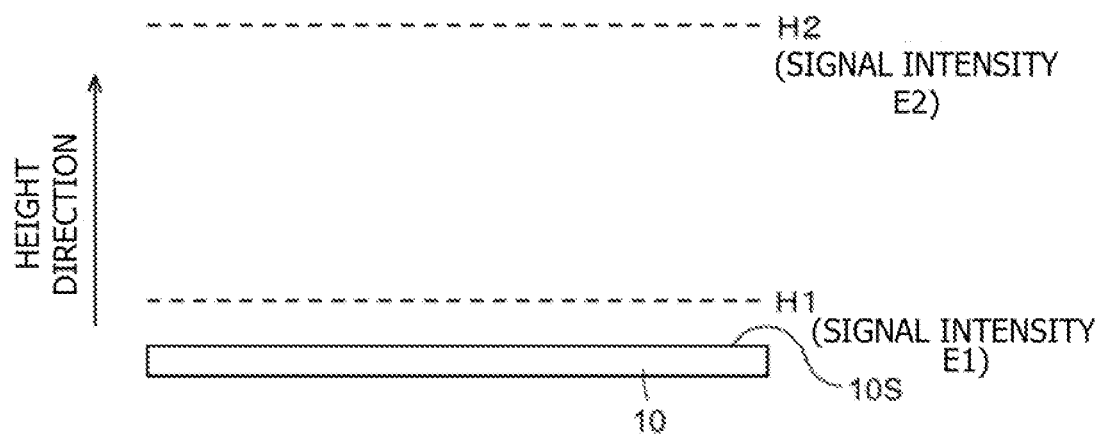
FIG. 7 is a diagram used for explanation of a position detecting device according to an embodiment.

FIG. 7 shows one example of the relationship between the signal intensity stored in the ROM of the microprocessor 110 and the height of the stylus pen 50 from a sensor surface 10S of the position detecting sensor 10. In FIG. 7, the surface of the position detecting sensor 10 to which indication is input by the stylus pen 50 is treated as the sensor surface 10S. However, if electrodes are formed not only on the indication input surface side but also on the surface on the opposite side thereto in the transparent substrate 11 of the position detecting sensor 10, the sensor surface 10S of the position detecting sensor 10 is defined on the basis of both the indication input surface and the surface on the opposite side thereto.

In the example of FIG. 7, data E1 of the signal intensity when the stylus pen 50 is disposed at a height H1 closer to the sensor surface 105, such as when the height from the sensor surface 10S of the position detecting sensor is, e.g., 5 mm or lower, and data E2 of the signal intensity when the stylus pen 50 is disposed at a height H2 farther from the sensor surface 10S, such as when the height from the sensor surface 10S of the position detecting sensor is, e.g., 20 mm or higher, are stored in the ROM of the microprocessor 110 corresponding to the respective heights H1 and H2.

In this embodiment, it is detected whether the stylus pen 50 is disposed at a position higher than the height H2 by detecting whether or not the existence of the stylus pen 50 is detected over the position detecting sensor 10, i.e., the stylus pen 50 is detected in the hover state, as described later. Therefore, the data of the signal intensity corresponding to the height H2, stored in the ROM, is used as a threshold for determining whether the differential amplification output of the differential amplifier 104 is significant in electrode selection states shown in FIGS. 8 and 9 to be described later.

Furthermore, regarding the height H1, a determination is made by using a value of integral, the maximum value, or the like of the differential amplification output obtained by sequentially moving one pair of electrodes for differential amplification processing in an electrode selection state shown in FIG. 10A or 10B to be described later. Therefore, in the ROM of the microprocessor 110, a threshold when the height is the height H1 is stored regarding a value of integral or the maximum value of the differential amplification output.

The microprocessor 110 includes a height detector that detects the height of the stylus pen 50 from the sensor surface 10S by monitoring the digital signal d from the AD conversion circuit 108. Furthermore, in this embodiment, the microprocessor 110 controls the control circuit 109 to change the interval between the electrode of the position detecting sensor 10 connected to the positive-side input terminal of the differential amplifier 104 and the electrode of the position detecting sensor 10 connected to the negative-side input terminal of the differential amplifier 104 according to the height of the stylus pen 50 from the sensor surface 10S of the position detecting sensor. On the basis of the control signal g from this microprocessor 110, the control circuit 109 supplies the control signal e to the X-selection circuit 101 to enable selection of one pair of X-electrodes and supplies the control signal f to the Y-selection circuit 102 to enable selection of one pair of Y-electrodes.

Figure 8:
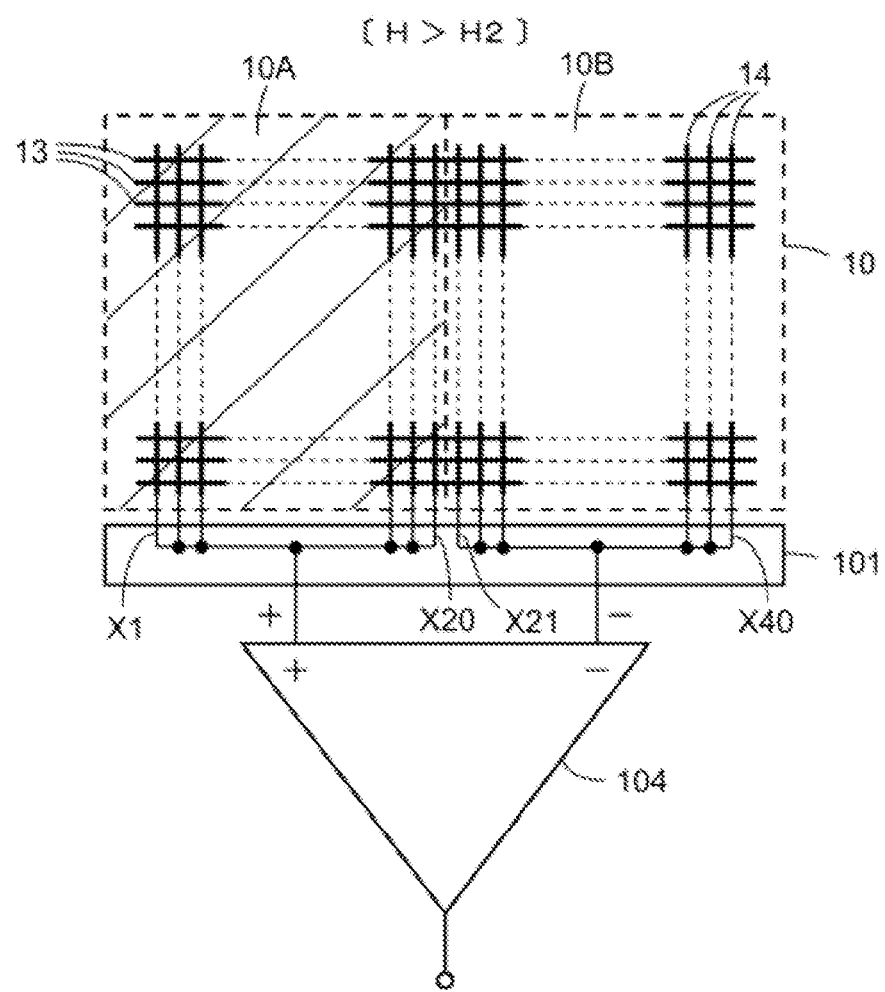
FIG. 8 is a diagram for explaining selection control of electrodes according to the position of a stylus pen in a height direction in a position detecting device according to an embodiment.

FIGS. 8 to 10 show examples in which the electrode selection pattern set according to the height of the stylus pen 50 from the sensor surface 10S is dynamically controlled by the X-selection circuit 101 corresponding to the control signal e from the control circuit 109. Although the switching circuit 103 intervenes between each of the X-selection circuit 101 and the Y-selection circuit 102 and the differential amplifier 104, the description will be made with omission of the switching circuit 103 in FIGS. 8 to 10 for simplification.

FIG. 8 is a diagram showing the electrode selection state of the X-selection circuit 101 when the stylus pen 50 is in the hover state in which the height H of the stylus pen 50 from the sensor surface 10S satisfies a relationship of H>H2. A case in which the stylus pen 50 is not disposed over the indication input surface of the position detecting sensor 10 is also included in the case in which the height H of the stylus pen 50 from the sensor surface 10S satisfies the relationship of H>H2.

In this case, as shown in FIG. 8, on the basis of the control signal e from the control circuit 109, the X-selection circuit 101 joins all of the X-electrodes (X1 to X20) disposed in a left-half region 10A (region shown with hatched lines in FIG. 8) of the position detecting sensor 10 and connects these X-electrodes to the positive-side input terminal of the differential amplifier 104. Meanwhile, the X-selection circuit 101 joins all of the X-electrodes (X21 to X40) disposed in a right-half region 10B of the position detecting sensor 10 and connects these X-electrodes to the negative-side input terminal of the differential amplifier 104. Therefore, a signal from all of the X-electrodes disposed in the left-half region 10A of the position detecting sensor 10 and a signal from all of the X-electrodes disposed in the right-half region 10B are supplied to the differential amplifier 104, and differential amplification processing is executed between the respective signals.

In this case, when the stylus pen 50 is not disposed over the sensor surface 10S of the position detecting sensor 10, the differential amplification output of the differential amplifier 104 is not at a significant signal level. That is, the set predetermined condition is not satisfied. On the other hand, when the stylus pen 50 exists at a predetermined height over the sensor surface 10S of the position detecting sensor 10, the differential amplification output of the differential amplifier 104 is at a significant signal level. That is, in this case, the set predetermined condition is satisfied. This allows detection of the existence of the stylus pen 50 over the position detecting sensor 10.

Furthermore, in this embodiment, when the height H of the stylus pen 50 from the sensor surface 10S satisfies the relationship of H>H2, the microprocessor 110 carries out electrode selection control by the X-selection circuit 101 shown in FIG. 9 on the basis of the control signal e from the control circuit 109 in addition to the electrode selection control by the X-selection circuit 101 shown in FIG. 8.

Specifically, in FIG. 9, on the basis of the control signal e from the control circuit 109, the X-selection circuit 101 generates subdivided regions by subdividing each of the left-half region 10A and the right-half region 10B of the position detecting sensor 10 to, e.g., ½. Furthermore, the X-selection circuit 101 joins all of the X-electrodes included in a divided region 10Aa (X-electrodes: X1 to X10) as the left side of the left-half region 10A and a divided region 10Bb (X-electrodes: X31 to X40) as the right side of the right-half region 10B, shown with hatched lines in FIG. 9, and connects these X-electrodes to the positive-side input terminal of the differential amplifier 104. Meanwhile, the X-selection circuit 101 joins all of the X-electrodes included in a divided region 10Ab (X-electrodes: X11 to X20) as the right side of the left-half region 10A and a divided region 10Ba (X-electrodes: X21 to X30) as the left side of the right-half region 10B and connects these X-electrodes to the negative-side input terminal of the differential amplifier 104.

As shown in FIG. 9, when the stylus pen 50 exists at a predetermined height over the sensor surface 10S of the position detecting sensor 10, the differential amplification output from the differential amplifier 104 becomes a significant signal level through selection control of the X-electrodes by the X-selection circuit 101. That is, the set predetermined condition is satisfied. This allows detection of the existence of the stylus pen 50 over the position detecting sensor 10.

Furthermore, by the detection of the stylus pen 50 in the electrode selection state by the X-selection circuit 101 shown in FIG. 8, it can be detected whether or not the stylus pen 50 is disposed in either the right region or the left region of the sensor surface 10S. In the following description, this detection will be referred to as the detection step A. By the detection of the stylus pen 50 in the electrode selection state by the X-selection circuit 101 shown in FIG. 9, it can be detected whether or not the stylus pen 50 is disposed in either the center region or both end regions over the sensor surface 10S. In the following description, this detection will be referred to as the detection step B.

In this embodiment, the detection step A and the detection step B are alternately repeated until it is detected that the differential amplification output of the differential amplifier 104 has become significant in either step of the detection step A and the detection step B. Thereby, detection of the existence state of the stylus pen 50 is allowed at whichever position over the sensor surface 10S of the position detecting sensor 10 the stylus pen 50 exists. It is also possible to carry out only one step of the detection step A or the detection step B without alternately repeating the detection step A and the detection step B.

The case of carrying out electrode selection control by the X-selection circuit 101 is described above. In the case of carrying out electrode selection control by the Y-selection circuit 102, the sensor surface 10S is divided in the vertical direction and the detection step A and the detection step B are carried out similarly to the above description.

Next, FIG. 10A is a diagram showing the electrode selection state by the X-selection circuit 101 when the stylus pen 50 is in the hover state in which the height H of the stylus pen 50 from the sensor surface 10S satisfies a relationship of H2≥H>H1.

Specifically, in this case, on the basis of the control signal e from the control circuit 109, the X-selection circuit 101 selects electrodes to connect one electrode of two X-electrodes separated from each other with the intermediary of a predetermined number n (n=1, 2, . . . ) of electrodes to the positive-side input terminal of the differential amplifier 104 and connect the other electrode to the negative-side input terminal of the differential amplifier 104. In the example of FIG. 10A, the X-selection circuit 101 selects the X-electrode Xi and the X-electrode X(i+5) separated from each other by four electrodes (n=4). Furthermore, the X-selection circuit 101 connects the X-electrode Xi (i is a natural number) to the positive-side input terminal of the differential amplifier 104 and connects the X-electrode X(i+5) to the negative-side input terminal of the differential amplifier 104.

Figure 14:
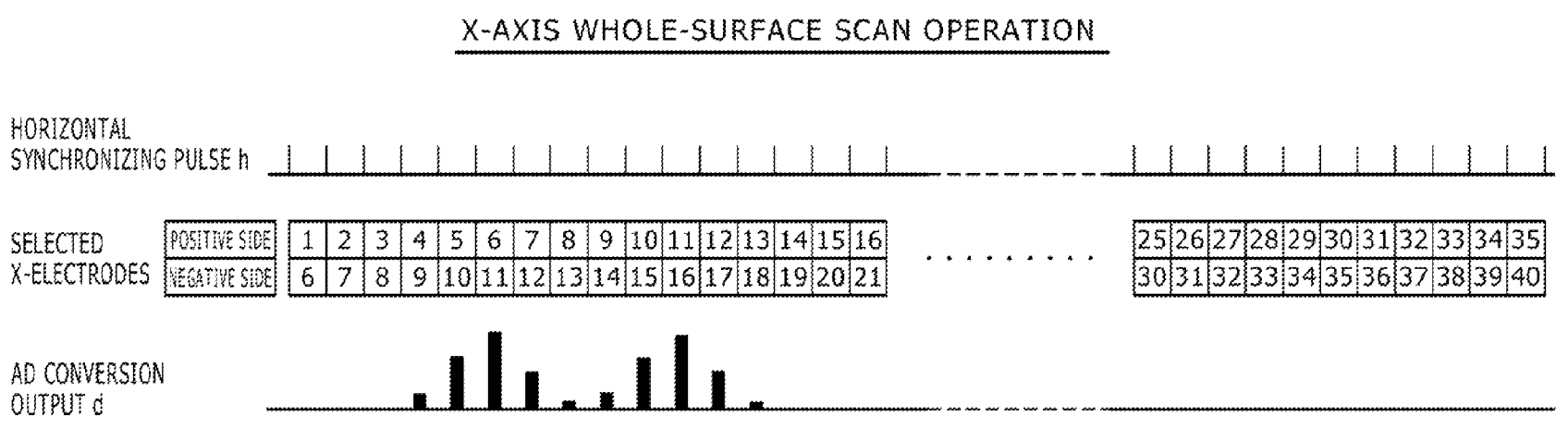
Figure 15:
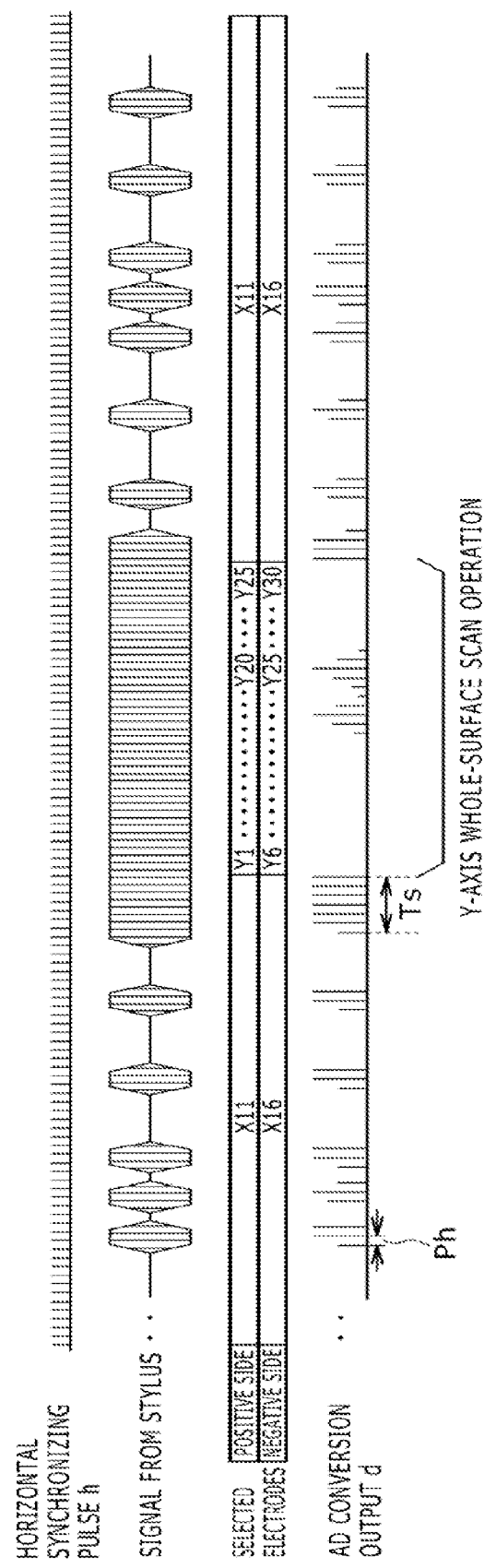
FIG. 15 is a diagram for explaining a processing operation of a position detecting device according to an embodiment.

This electrode selection processing by the X-selection circuit 101 in FIG. 10A is executed about the X-electrodes near an approximate position (rough position) of the stylus pen 50 obtained by a rough position detection operation to be described later (FIGS. 14 and 15). In this case, on the basis of the control signal e from the control circuit 109, the X-selection circuit 101 sequentially selects one pair of X-electrodes Xi and X(i+5) for differential amplification processing near the rough position in such a manner as to sequentially shift each of these X-electrodes in the X-direction by one electrode in each shift (increase or decrease i one by one) in this example. Each of these X-electrodes may be shifted by plural electrodes in each shift.

Due to the above, in the hover state in which the height H of the stylus pen 50 from the sensor surface 10S satisfies the relationship of H2≥H>H1, differential amplification processing is executed in the differential amplifier 104 between signals of the one pair of X-electrodes Xi and X(i+5) separated from each other by n electrodes. Thus, the position detecting device can favorably detect the hover position of the stylus pen 50 over the position detecting sensor 10 although a cancel effect against external noise that enters attributed to the contact of a hand or finger with the position detecting sensor 10 is lowered. In the following description, this operation described by using FIG. 10A will be referred to as the detailed position detection operation A. A method for detecting the position of the stylus pen 50 by this detailed position detection operation A will be described later.

Next, FIG. 10B shows the electrode selection state by the X-selection circuit 101 in the case of a state in which the stylus pen 50 has come close to the sensor surface 10S and the height H of the stylus pen 50 from the sensor surface 10S has come to satisfy a relationship of H1≥H (including a state in which the stylus pen 50 is in contact with the sensor surface 10S of the position detecting sensor 10). In this case, on the basis of the control signal e from the control circuit 109, the X-selection circuit 101 selects electrodes to connect one of adjacent two X-electrodes Xi and X(i+1) (X electrode Xi, in the example of FIG. 10B) to the positive-side input terminal of the differential amplifier 104 and connect the other (X electrode X(i+1), in the example of FIG. 10B) to the negative-side input terminal of the differential amplifier 104.

When the height H of the stylus pen 50 is a height close to the sensor surface 10S (H1≥H), external noise that enters attributed to the contact of a hand or finger with the position detecting sensor 10 can be effectively cancelled by executing differential amplification processing between signals of the adjacent two X-electrodes Xi and X(i+1). Therefore, the position detecting device can favorably detect the position indicated by the stylus pen 50 because, even when a hand or finger is in contact with the sensor surface 10S, the one pair of electrodes selected for the differential amplification processing are electrodes adjacent to each other and thus the influence of external noise can be eliminated.

This electrode selection processing by the X-selection circuit 101 in FIG. 10B is executed about the X-electrodes near a rough position of the stylus pen 50 detected by the operation of detecting the rough position similarly to the electrode selection control in FIG. 10A. In this case, on the basis of the control signal e from the control circuit 109, the X-selection circuit 101 sequentially selects the X-electrodes Xi and X(i+1) for the differential amplification processing in such a manner as to sequentially shift each of these X-electrodes in the X-direction by one electrode in each shift (increase or decrease i one by one) in this example in the region range in which the stylus pen 50 is estimated to exist. Each of these X-electrodes may be shifted by plural electrodes in each shift.

Furthermore, the position detecting device detects the position of the stylus pen 50 in the position detecting sensor 10 on the basis of a change in the signal level of the differential signal output from the differential amplifier 104 when the electrodes are selected with increment of i of the adjacent two X-electrodes Xi and X(i+1) one by one. In the following description, this operation described by using FIG. 10B will be referred to as the detailed position detection operation B. A method for detecting the position of the stylus pen 50 by this detailed position detection operation B will be described later.

FIG. 11 is a diagram for explaining processing of detecting, by the detailed position detection operation B, the position indicated by the stylus pen 50 on the sensor surface 10S of the position detecting sensor 10 on the basis of the signal level of the differential signal output from the differential amplifier 104 about the adjacent two X-electrodes Xi and X(i+1).

In the example of FIG. 11, the configuration is made so that the position of the stylus pen 50 on the sensor surface 10S of the position detecting sensor 10 has a coordinate accuracy obtained in consideration of even the respective positions of plural X-electrodes adjacent to each other. Specifically, the following positions can be detected as the position of the stylus pen 50 in the example of FIG. 11: a position A (position in the X-axis direction, the same applies hereinafter) just above the X-electrode Xi; a position E just above an adjacent X-electrode X(i+1); and plural positions between these positions A and E, shown as three positions B, C, and D in this example. That is, even when the stylus pen 50 is located between adjacent two X-electrodes, the position thereof can be detected with high accuracy.

As described above, the X-selection circuit 101 selects one pair of electrodes composed of adjacent two X-electrodes, with each of these electrodes sequentially shifted by one electrode in each shift. Specifically, in the example of FIG. 11, the X-selection circuit 101 sequentially switches the electrodes forming one pair among the following pairs of electrodes by sequentially shifting the electrodes that should be selected: a pair S1 of X-electrodes X(i−3) and X(i−2), a pair S2 of X-electrodes X(i−2) and X(i−1), a pair S3 of X-electrodes X(i−1) and Xi, a pair S4 of X-electrodes Xi and X(i+1), a pair S5 of X-electrodes X(i+1) and X(i+2), a pair S6 of X-electrodes X(i+2) and X(i+3), and a pair S7 of X-electrodes X(i+3) and X(i+4). As shown in FIG. 11, the pair of two X-electrodes Xi and X(i+1) corresponding to the above-described positions A to E is the pair S4 and the above-described seven pairs S1 to S7 show plural pairs of electrodes centered at this pair S4.

In this case, when each of the above-described positions A to E is indicated by the stylus pen 50, the signal level of the signal output from the differential amplifier 104 when the respective pairs S1 to S7 of electrodes are selected exhibits change according to each of the above-described positions A to E as shown in FIG. 11. Therefore, the microprocessor 110 can detect which position among the positions A to E the position of the stylus pen 50 in the X-direction is by determining which one of the distribution patterns shown in FIG. 11 the signal level output from the differential amplifier 104 exhibits as the distribution pattern about the respective pairs S1 to S7 of electrodes on the basis of the digital signal d from the AD conversion circuit 108.

The microprocessor 110 can detect the position of the stylus pen 50 in the position detecting sensor 10 from the ratio of the signal levels of the signal output from the differential amplifier 104 in the respective cases of the above-described seven pairs S1 to S7.

The above description shows selection examples of one pair of electrodes selected by the X-selection circuit 101 for being connected to the positive-side input terminal and the negative-side input terminal of the differential amplifier 104. However, the concept of the above description can be similarly applied also to one pair of Y-electrodes selected by the Y-selection circuit 102. That is, selection control of the Y-electrodes selected by the Y-selection circuit 102 can be carried out corresponding to the height of the stylus pen 50 from the sensor surface 10S.

[Electrode Selection Processing by Microprocessor 110 Through Control Circuit 109]

In the above-described manner, the microprocessor 110 detects the intensity of a signal received from the stylus pen 50 from the digital signal d from the AD conversion circuit 108. Then, on the basis of the detected signal intensity, the microprocessor 110 detects which range the height of the stylus pen 50 belongs to by referring to information of the signal intensity stored in the ROM, i.e., information showing the relationship with the height of the stylus pen 50 relative to the sensor surface 10S of the position detecting sensor 10. Then, on the basis of the detected height of the stylus pen 50, the microprocessor 110 controls the X-selection circuit 101 and the Y-selection circuit 102 as described above through the control circuit 109 to detect the position indicated by the stylus pen 50 on the sensor surface 10S of the position detecting sensor 10.

Figure 12:
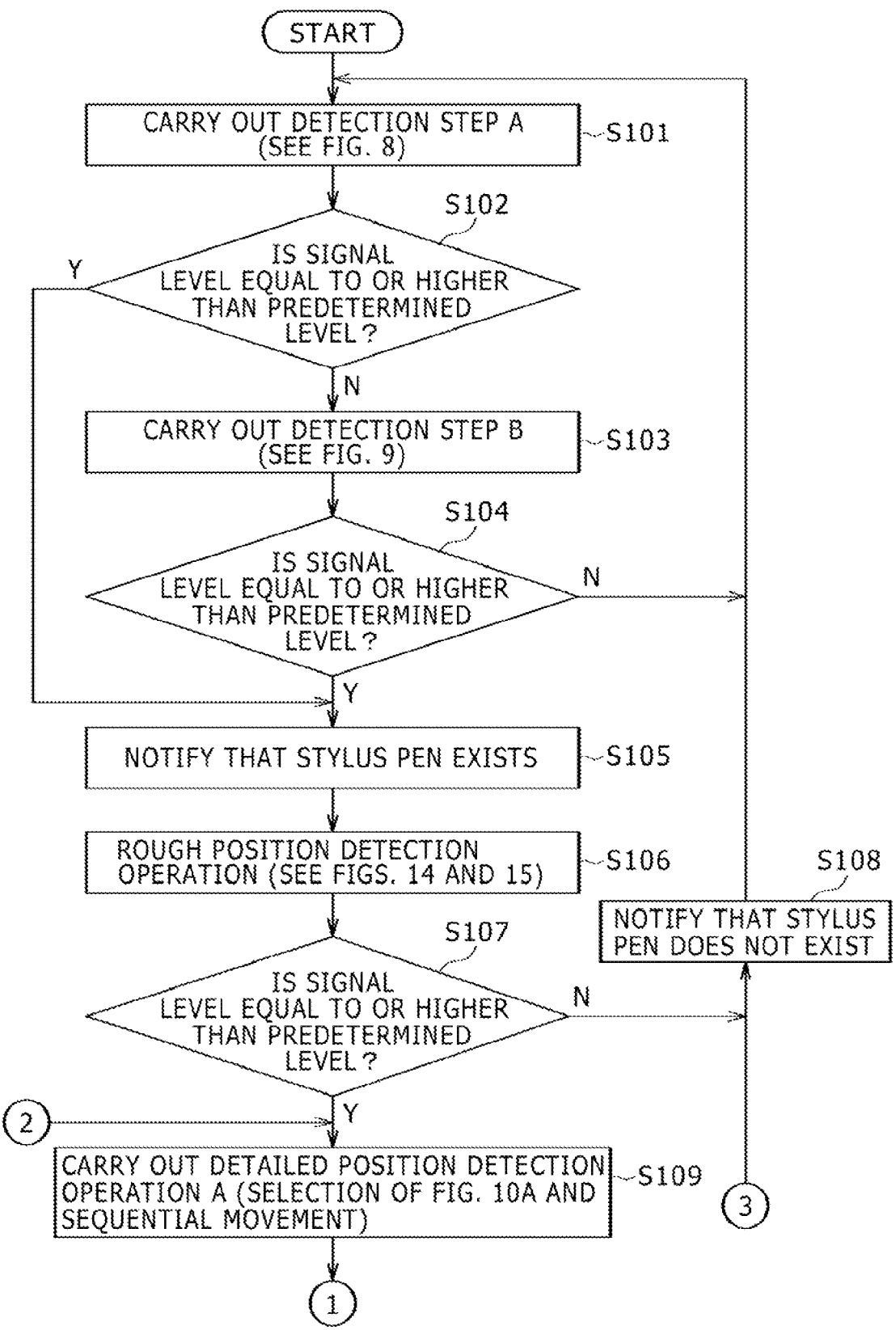
FIG. 12 is a diagram showing part of a flowchart for explaining a processing operation of a position detecting device according to an embodiment.
Figure 13:
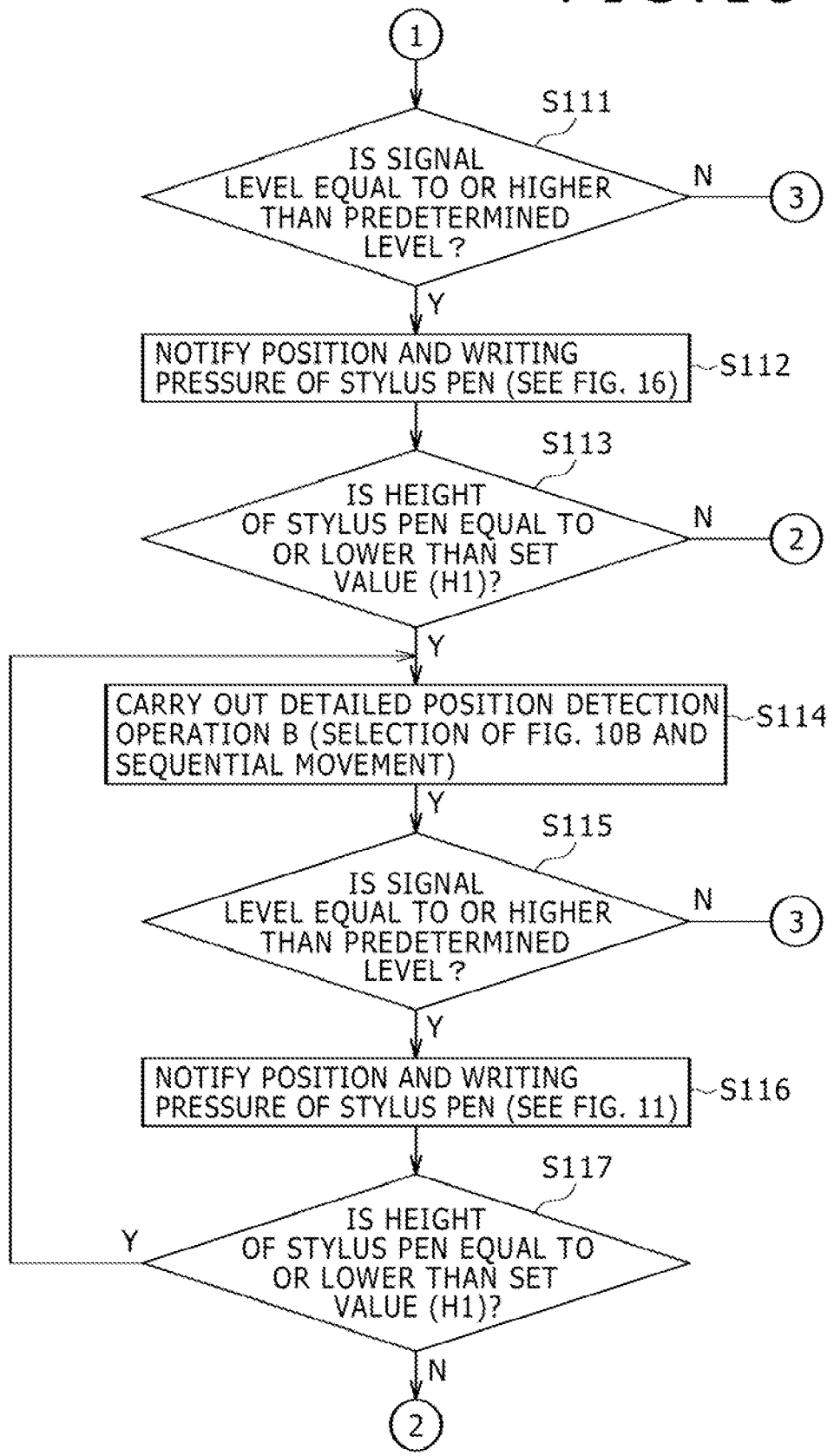
FIG. 13 is a diagram showing part of a flowchart for explaining a processing operation of a position detecting device according to an embodiment.

FIGS. 12 and 13 show an example of a processing routine of an electrode selection control by the microprocessor 110 with the X-selection circuit 101 and the Y-selection circuit 102 according to the height of the stylus pen 50 relative to the sensor surface 10S of the position detecting sensor 10. In this example of FIGS. 12 and 13, in the hover state in which the stylus pen 50 is disposed at a position higher than the height H2, the microprocessor 110 carries out the electrode selection control with one of the X-selection circuit 101 and the Y-selection circuit 102, specifically, in the following example, the X-selection circuit 101. Then, when the height of the stylus pen 50 becomes H2 or lower, the microprocessor 110 detects the position (X-coordinate, Y-coordinate) indicated by the stylus pen 50 over the sensor surface 10S (including the hover state) by carrying out the electrode selection control for each of the X-selection circuit 101 and the Y-selection circuit 102. As described above, when the existence of the stylus pen 50 cannot be detected, the microprocessor 110 determines that the stylus pen 50 exists at a position higher than the height H2 or is not disposed over the sensor surface 10S.

In response to power activation of the position detecting device, the microprocessor 110 initiates processing from the start in FIG. 12. First, as shown in FIG. 8, the microprocessor 110 carries out the detection step A to control the X-selection circuit 101 in such a manner that all of the X-electrodes disposed in the left-half region 10A of the position detecting sensor 10 are connected to the positive-side input terminal of the differential amplifier 104 and all of the X-electrodes disposed in the right-half region 10B of the position detecting sensor 10 are connected to the negative-side input terminal of the differential amplifier 104 (step S101).

Then, the microprocessor 110 takes in the digital signal d from the AD conversion circuit 108 and determines whether or not the signal level of the signal output from the differential amplifier 104 is a signal level having significance corresponding to the case in which the stylus pen 50 is disposed over the position detecting sensor 10 (step S102).

If it is determined in the step S102 that the signal level of the signal output from the differential amplifier 104 is not at a significant signal level, i.e., if the set condition is not satisfied, the microprocessor 110 controls the X-selection circuit 101 and carries out the detection step B to carry out control to connect all of the X-electrodes included in the divided region 10Aa as the left side of the left-half region 10A of the position detecting sensor 10 and the divided region 10Bb as the right side of the right-half region 10B of the position detecting sensor 10, shown with hatched lines in FIG. 9, to the positive-side input terminal of the differential amplifier 104 and connect all of the X-electrodes included in the other divided regions 10Ab and 10Ba to the negative-side input terminal of the differential amplifier 104 (step S103).

Next, in the electrode selection state in the step S103, the microprocessor 110 determines whether or not the signal level of the signal output from the differential amplifier 104 is a signal level having significance corresponding to the case in which the stylus pen 50 is disposed over the position detecting sensor 10 (step S104). If it is determined in the step S104 that the signal level of the signal output from the differential amplifier 104 is not at a significant signal level, i.e., if the set condition is not satisfied, the microprocessor 110 returns the processing to the step S101 and repeats the processing of this step S101.

If it is determined in the step S102 or S104 that the signal level of the signal output from the differential amplifier 104 is at a significant signal level, i.e., if the set condition is satisfied, the microprocessor 110 notifies that the stylus pen 50 is disposed over the position detecting sensor 10 to an external device to which the position detecting device is connected, specifically, e.g., a host computer (step S105).

Next, the microprocessor 110 carries out operation of detecting a rough position of the stylus pen 50 over the sensor surface 10S, specifically, in this example, a whole-surface scan operation in the X-axis direction and a transition operation to the detailed position detection operation A (step S106). FIG. 14 is a diagram showing the whole-surface scan operation in the X-axis direction. Specifically, FIG. 14 shows an X-axis direction whole-surface scan operation in which the X-selection circuit 101 selects one pair of electrodes having a predetermined electrode placement relationship and sequentially selects electrodes while keeping this electrode placement relationship to receive a signal about all of the X-electrodes and thereby an approximate position at which the stylus pen 50 is put is obtained.

As shown in FIG. 2, the first the control circuit 109 supplies the control signal a to the switching circuit 103 corresponding to the control signal g supplied from the microprocessor 110 to the control circuit 109. By the control signal a, the switching circuit 103 carries out control so that the X-selection circuit 101 may be connected to the differential amplifier 104. Referring back to FIG. 14, through control of the X-selection circuit 101 on the basis of the control signal e from the control circuit 109, first the X-electrodes X1 and X6 are selected and the configuration is made so that a signal is supplied to each of the positive-side input terminal and the negative-side input terminal of the differential amplifier 104. Therefore, a differential signal between the X-electrodes X1 and X6 is output from the differential amplifier 104 and thereby the signal level of the differential signal can be obtained.

Next, the control signal g is supplied from the microprocessor 110 to the control circuit 109 so that the numbers of the electrodes selected by the X-selection circuit 101 may be each incremented by one, in this example, and the X-electrodes X2 and X7 may be each selected. By this control, the configuration is made so that the X-electrodes X2 and X7 are connected to the positive-side input terminal and the negative-side input terminal, respectively, of the differential amplifier 104, and the signal level of the differential signal is obtained similarly to the above description. In a similar manner, the microprocessor 110 carries out control to sequentially increment the numbers of the X-electrodes selected by the X-selection circuit 101 and obtains the signal level of the differential signal. This processing is executed until the X-electrode connected to the positive-side input terminal of the differential amplifier 104 becomes X35 and the X-electrode connected to the negative-side input terminal of the differential amplifier 104 becomes X40.

FIG. 14 shows a case in which the stylus pen 50 is put near the X-electrode X11 of the position detecting sensor 10. In this case, in the rough position detection operation, the signal level of the differential signal shows a peak when the X-electrode X11 is selected to be connected to either the positive-side input terminal or the negative-side input terminal of the differential amplifier 104 in the X-selection circuit 101 as shown in FIG. 14. In this manner, the approximate position of the stylus pen 50 over the position detecting sensor 10 can be obtained from the distribution of the signal level of the differential signal when the X-electrode selection is updated. After finding that the stylus pen 50 is put near the X-electrode X11 from the signal level distribution in FIG. 14, the transition operation to the detailed position detection operation A is carried out next.

FIG. 15 shows the transition operation to the detailed position detection operation A. The timing when the stylus pen 50 enters the continuous transmission period of the oscillation signal in FIG. 6 is detected and an approximate position of the stylus pen 50 in the Y-direction in the position detecting sensor 10 is obtained.

First, the control circuit 109 supplies the control signal a to the switching circuit 103 corresponding to the control signal g output from the microprocessor 110. Thereby, the configuration is made so that the X-selection circuit 101 is connected to the differential amplifier 104. Furthermore, the control signal e is supplied from the control circuit 109 to the X-selection circuit 101. Thereby, in this example, the X-electrodes X11 and X16 are each selected. The X-electrodes X11 and X16 are connected to the positive-side input terminal and the negative-side input terminal, respectively, of the differential amplifier 104, so that the differential signal between the X-electrodes X11 and X16 is output. The signal level thereof is sequentially obtained corresponding to the processing of selection of one pair of X-electrodes.

In the continuous transmission period of the oscillation signal shown in FIG. 6, the value of the digital signal d output from the AD conversion circuit 108 repeatedly becomes a predetermined value or larger. When it is detected that the value of the digital value d repeatedly surpasses the predetermined value for a predetermined time Ts (see FIG. 15) or longer, the microprocessor 110 determines that the present period is the continuous transmission period of the oscillation signal and makes transition to Y-axis direction whole-surface scan operation. This predetermined time Ts is set to a time sufficiently longer than the cycle Td of transmission by the stylus pen 50 in the data transmission period.

In order to carry out the Y-axis direction whole-surface scan operation, the control circuit 109 supplies the control signal a to the switching circuit 103 on the basis of the control signal g supplied from the microprocessor 110 and thereby the Y-selection circuit 102 is connected to the differential amplifier 104. Furthermore, the control circuit 109 supplies the control signal f to the Y-selection circuit 102. Thereby, in this example, one pair of Y-electrodes Y1 and Y6 are selected at first and the respective electrodes are connected to the positive-side input terminal and the negative-side input terminal of the differential amplifier 104.

Next, similarly to the X-axis direction whole-surface scan, the microprocessor 110 obtains the signal level of the signal output from the differential amplifier 104 while sequentially incrementing each of the numbers of the electrodes selected by the Y-selection circuit 102 one by one in this example. This processing is executed until the Y-electrode connected to the positive-side input terminal of the differential amplifier 104 becomes Y25 and the Y-electrode connected to the negative-side input terminal of the differential amplifier 104 becomes Y30. The electrode selection in the Y-selection circuit 102 is carried out by the control signal f output from the control circuit 109 in synchronization with the horizontal synchronizing pulse h. Also at this time, similarly to the X-axis direction whole-surface scan, such signal distribution is obtained that a peak appears when one or the other of the one pair of electrodes selected by the Y-selection circuit 102 is selected as an electrode close to the stylus pen 50. The example of FIG. 15 is a case in which the stylus pen 50 is put near the Y-electrode Y20.

By the X-axis direction whole-surface scan of FIG. 14 and the transition operation to the detailed position detection operation A of FIG. 15 described above, it can be detected that the stylus pen 50 is put near the intersection of the X-electrode X11 and the Y-electrode Y20.

In the Y-axis direction whole-surface scan operation shown in FIG. 15, one pair of electrodes selected by the Y-selection circuit 102 are separated from each other with the intermediary of four electrodes therebetween. However, the electrode selection control may be so carried out that electrodes in a number other than four intervene between the selected electrodes.

Referring back to FIG. 12, the microprocessor 110 determines whether or not there is a value surpassing a predetermined signal level in the digital signal d from the AD conversion circuit 108 in the rough position detection operation in the step S106 (step S107). If determining that the value of the digital signal d from the AD conversion circuit 108 reaches the predetermined signal level in neither the above-described X-axis direction whole-surface scan operation nor Y-axis direction whole-surface scan operation, the microprocessor 110 determines that the stylus pen 50 is not disposed over the position detecting sensor 10 and notifies the host computer of that effect (step S108). Then, the microprocessor 110 returns the processing from this step S108 to the step S101 and repeats the processing of the step S101 and the subsequent steps.

If determining that there is a value surpassing the predetermined signal level in the digital signal d from the AD conversion circuit 108 in the step S107, the microprocessor 110 carries out the detailed position detection operation A described by using FIG. 10A near the rough position after detecting the rough position in the X-axis direction and the Y-axis direction as described above by carrying out the above-described X-axis direction whole-surface scan operation and transition operation to the detailed position detection operation A (step S109).

Then, as shown in FIG. 13, the microprocessor 110 determines whether or not there is a value surpassing the predetermined signal level in the digital signal d from the AD conversion circuit 108 in this detailed position detection operation A (step S111). If a determination is made that the value of the digital signal d from the AD conversion circuit 108 reaches the predetermined signal level in none of the above-described cases, the microprocessor 110 determines that the stylus pen 50 is not disposed over the position detecting sensor 10 and notifies the host computer of that effect (step S108). Then, the microprocessor 110 returns the processing from this step S108 to the step S101 and repeats the processing of the step S101 and the subsequent steps.

If a determination is made that there is a value surpassing the predetermined signal level in the digital signal d from the AD conversion circuit 108 in the step S111, the microprocessor 110 obtains the position of the stylus pen 50 over the sensor surface 10S in the following manner and notifies the host computer of the obtained position (step S112).

Figure 16:
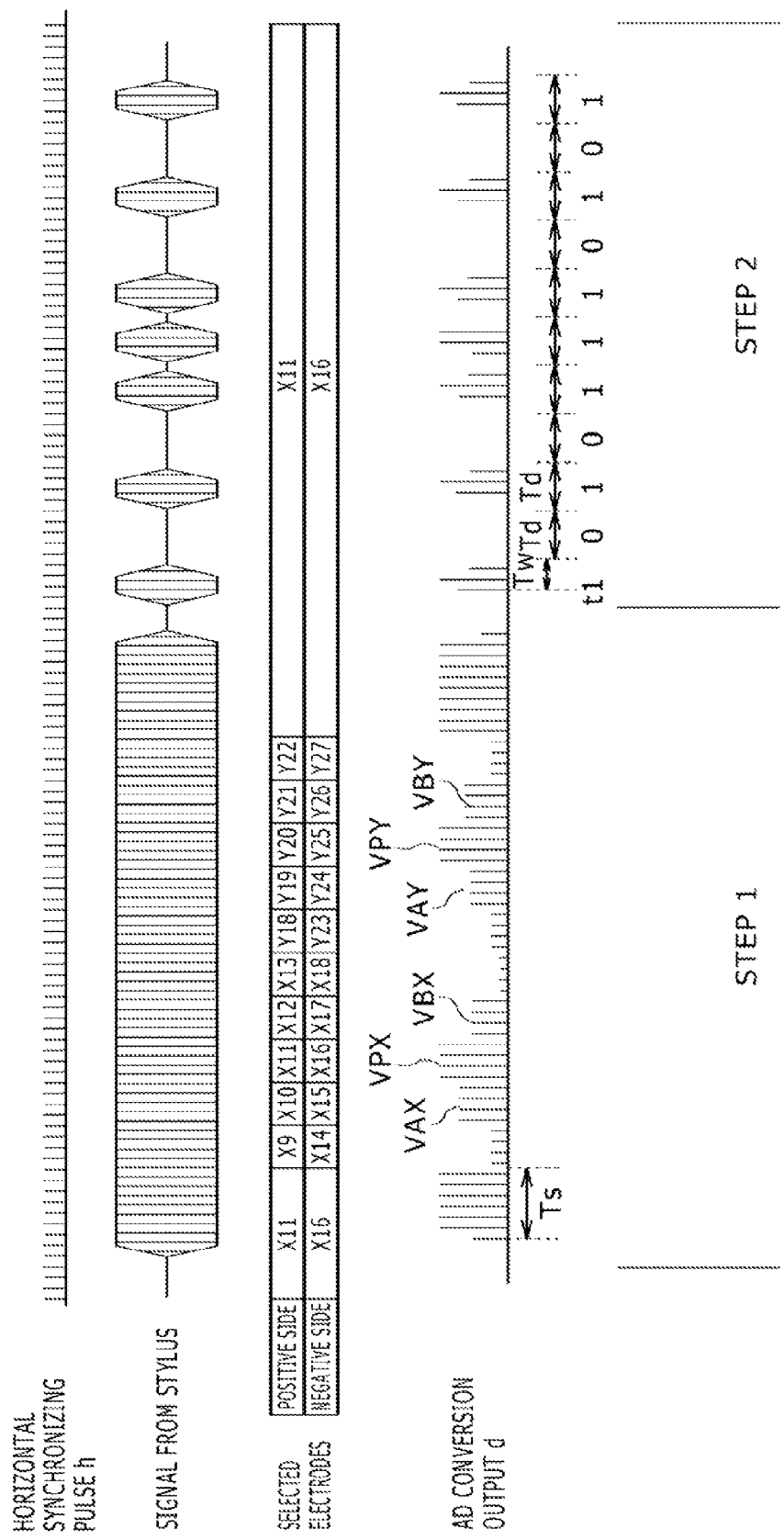
FIG. 16 is a diagram for explaining a processing operation of a position detecting device according to an embodiment.

FIG. 16 is a diagram showing this detailed position detection operation A. A description will be made with reference to FIG. 2. When the signal level of the signal output from the AD conversion circuit 108 is equal to or higher than a predetermined value for the predetermined time Ts continuously in a state in which the X-electrodes X11 and X16, in this example, are selected by the X-selection circuit 101 as the electrodes that should be connected to the positive-side input terminal and the negative-side input terminal, respectively, of the differential amplifier 104, the microprocessor 110 determines that the continuous transmission period of the oscillation signal from the stylus pen 50 has been started, and makes transition to the operation of detecting the position of the stylus pen 50 (step 1 in FIG. 16). This time Ts is set to a time sufficiently longer than the cycle Td of a digital signal transmitted by the stylus pen 50 in the data transmission period as with the description with FIG. 15.

In order to obtain the X-coordinate of the position indicated by the stylus pen 50, in the state in which the switching circuit 103 selects the X-selection circuit 101, the microprocessor 110 sequentially selects five X-electrodes centered at the X-electrode X11 (X9 to X13) by the X-selection circuit 101 as the electrode that should be connected to the positive-side input terminal of the differential amplifier 104, and reads the signal level (step 1 in FIG. 16). At this time, as the electrode that should be connected to the negative-side input terminal of the differential amplifier 104, the X-selection circuit 101 selects, e.g., the X-electrodes X14 to X18 as the X-electrodes sufficiently separate from the X-electrodes (X9 to X13) selected as the electrode that should be connected to the positive-side input terminal of the differential amplifier 104.

As the operation at this time, as shown in FIG. 3, signal reception and AD conversion are each carried out in synchronization with the horizontal synchronizing pulse h. In addition, in the present embodiment, the signal detection is carried out plural times, specifically, e.g., four times, for the same electrode and the average signal level thereof is stored as the reception signal level.

In FIG. 16, when the highest signal level is detected, the number of the X-electrode selected as the electrode that should be connected to the positive-side input terminal of the differential amplifier 104 (here, X11) and this signal level VPX are stored. Furthermore, signal levels detected with both adjacent X-electrodes of this X-electrode are stored as VAX and VBX (step 1 in FIG. 16).

Next, in order to obtain the Y-coordinate of the position indicated by the stylus pen 50, the microprocessor 110 carries out control to cause the switching circuit 103 to select the Y-selection circuit 102. Furthermore, the microprocessor 110 sequentially selects five Y-electrodes centered at the Y-electrode Y20 (Y18 to Y22) by the Y-selection circuit 102 as the electrode that should be connected to the positive-side input terminal of the differential amplifier 104, and reads the signal level (step 1 in FIG. 16). At this time, as the electrode that should be connected to the negative-side input terminal of the differential amplifier 104, the Y-selection circuit 102 selects, e.g., the Y-electrodes Y23 to Y27 as the Y-electrodes sufficiently separate from the Y-electrodes (Y18 to Y22) selected as the electrode that should be connected to the positive-side input terminal of the differential amplifier 104. Also at this time, as shown in FIG. 3, signal reception and AD conversion are each carried out in synchronization with the horizontal synchronizing pulse h. In addition, plural times, specifically, e.g., four times, of signal detection are carried out for the same electrode and the average signal level thereof is stored as the reception signal level.

When the highest signal level is detected, the number of the Y-electrode selected as the electrode that should be connected to the positive-side input terminal of the differential amplifier 104 (here, Y20) and this signal level VPY are stored. Furthermore, signal levels detected with both adjacent electrodes of this Y-electrode are stored as VAY and VBY (step 1 in FIG. 16).

The signal levels VPX, VAX, VBX, VPY, VAY, and VBY obtained here are used for calculation of coordinate values on the basis of calculation expressions to be described later.

Subsequently, the microprocessor 110 carries out an operation for waiting for the end of the continuous transmission period of the oscillation signal from the stylus pen 50. The microprocessor 110 controls the switching circuit 103 so that the X-selection circuit 101 may be selected. In addition, the microprocessor 110 controls the X-selection circuit 101 so that the X-electrode X11, with which a peak is detected in the above-described coordinate detection operation, may be selected as the electrode that should be connected to the positive-side input terminal of the differential amplifier 104 and the X-electrode X16 may be selected as the electrode that should be connected to the negative-side input terminal of the differential amplifier 104. The time when the signal level received in this state comes to fall below the predetermined value is the end time of the continuous transmission period of the oscillation signal from the stylus pen 50 (step 1 in FIG. 16).

Upon detecting the end of the continuous transmission period of the oscillation signal from the stylus pen 50, the microprocessor 110 enters an operation of detecting the timing of the start signal transmitted prior to transmission of writing pressure data (step 2 in FIG. 16). The microprocessor 110 repeatedly carries out signal reception and AD conversion operations in synchronization with the horizontal synchronizing pulse h as shown in FIG. 3 in the state in which the X-selection circuit 101 selects the X-electrode X11 as the electrode that should be connected to the positive-side input terminal of the differential amplifier 104 and selects the X-electrode X16 as the electrode that should be connected to the negative-side input terminal of the differential amplifier 104.

At this time, the time when the signal level of the signal output from the differential amplifier 104 becomes equal to or higher than the above-described predetermined value is stored as t1. The microprocessor 110 starts an operation of receiving data from the stylus pen 50 from the time after awaiting of a certain time Tw from the time t1 (step 2 in FIG. 16). This time Tw is set to a predetermined time set from the time until the received signal level becomes almost zero after the start of transmission of the start signal from the stylus pen 50.

The microprocessor 110 activates a timer (not shown) simultaneously with the reaching of the above-described waiting time to the time Tw. This timer repeatedly counts from zero to a value corresponding with the above-described time Td (transmission cycle of data from the stylus pen 50) (step 2 in FIG. 16). During the operation period of one cycle of the timer, the microprocessor 110 repeatedly carries out signal reception and AD conversion to read the signal level. If the signal level during this period has never reached the above-described predetermined value, the microprocessor 110 determines that transmission from the stylus pen 50 is absent and stores the data in this operation period as "0." On the other hand, if a signal level equal to or higher than the predetermined value is detected, the microprocessor 110 determines that transmission from the stylus pen 50 is present and stores the data in this operation period as "1" (step 2 in FIG. 16).

Through ten times of counting of the above-described timer, a 10-bit data is stored. This 10-bit data corresponds to 10-bit writing pressure data shown in FIG. 6. FIG. 16 shows a case in which the writing pressure data is "0101110101."

In step 2 in FIG. 16, the data is received with the X-electrode X11, with which the maximum signal level is detected, selected among the X-electrodes in an exemplifying manner. However, the data may be received with the Y-electrode Y20, with which the maximum signal level is detected, selected among the Y-electrodes.

Upon ending the reception of the 10-bit writing pressure data in step 2 in FIG. 16, the microprocessor 110 makes transition to the operation of detecting the start of the continuous transmission period of the oscillation signal from the stylus pen 50 (step 1) and repeatedly carries out the operation in FIG. 16.

Next, a description will be made about one example of the method for obtaining the position indicated by the stylus pen 50 from the signal level obtained in step 1 in FIG. 16.

From the signal levels VPX, VAX, VBX, VPY, VAY, and VBY obtained in step 1 in FIG. 16, the coordinate values (X, Y) of the stylus pen 50 are each calculated by the following expressions.

$$X = Px + (Dx/2) \times ((VBX-VAX)/(2 \times VPX-VAX-VBX)) \quad \text{(expression 1)}$$

In this expression, Px is the coordinate position of the X-electrode with which the maximum signal level is detected (here, X11) on the X-axis, and Dx is the arrangement pitch between the X-electrodes.

$$Y = Py + (Dy/2) \times ((VBY-VAY)/(2 \times VPY-VAY-VBY)) \quad \text{(expression 2)}$$

In this expression, Py is the coordinate position of the Y-electrode with which the maximum signal level is detected (here, Y20) on the Y-axis, and Dy is the arrangement pitch between the Y-electrodes.

In the above-described embodiment, as the electrodes selected by the X-selection circuit 101 and the Y-selection circuit 102, the electrodes are so selected that the electrode that should be connected to the positive-side input terminal of the differential amplifier 104 is near the stylus pen 50. However, the electrode that should be connected to the negative-side input terminal of the differential amplifier 104 may be so selected as to be near the stylus pen 50. Furthermore, although the electrodes are so selected that four electrodes intervene between the respective electrodes selected as the electrodes that should be connected to the positive-side input terminal and the negative-side input terminal of the differential amplifier 104, the number of intervening electrodes is not limited to four. It is preferable to dispose electrodes in such a number as to provide an interval somewhat wider than the radiation region of an electric field radiated from the electrode 52 disposed in the core body 51 of the stylus pen 50 between one pair of electrodes selected by the X-selection circuit 101 and the Y-selection circuit 102 as the electrodes that should be connected to the positive-side input terminal and the negative-side input terminal of the differential amplifier 104.

Next, referring to FIG. 13, the microprocessor 110 detects the intensity of the signal from the stylus pen 50 on the basis of the digital signal d from the AD conversion circuit 108 and determines whether or not the height of the stylus pen 50 relative to the sensor surface 10S is equal to or lower than H1 set as the threshold for determining the state of proximity to the sensor surface 10S (step S113).

If it is determined in this step S113 that the height of the stylus pen 50 is not equal to or lower than H1, the microprocessor 110 returns the processing to the step S109 and repeats the processing of the detailed position detection operation A in this step S109 and the processing of the subsequent steps.

If it is determined in this step S113 that the height of the stylus pen 50 is equal to or lower than H1, the microprocessor 110 carries out control to carry out the detailed position detection operation B near the position detected by the detailed position detection operation A in the step S109 (step S114). Specifically, in the detailed position detection operation B, the microprocessor 110 connects one electrode of adjacent two X-electrodes Xi and X(i+1) to the positive-side input terminal of the differential amplifier 104 and connects the other electrode to the negative-side input terminal as shown in FIG. 10B. In addition, the microprocessor 110 changes i to sequentially change the pair of two X-electrodes Xi and X(i+1).

Then, the microprocessor 110 determines whether or not there is a value surpassing the predetermined signal level in the digital signal d from the AD conversion circuit 108 in this detailed position detection operation B (step S115). If a determination is made that the value of the digital signal d from the AD conversion circuit 108 reaches the predetermined signal level in none of the above-described cases, the microprocessor 110 determines that the stylus pen 50 is not disposed over the position detecting sensor 10 and notifies the host computer of that effect (step S108). Then, the microprocessor 110 returns the processing from this step S108 to the step S101 and repeats the processing of the step S101 and the subsequent steps.

If a determination is made in the step S115 that there is a value surpassing the predetermined signal level in the digital signal d from the AD conversion circuit 108, the microprocessor 110 obtains the position of the stylus pen 50 over the sensor surface 10S in the following manner and notifies the host computer of the obtained position (step S116).

In the detailed position detection operation A described by using FIG. 16, differential amplification processing between two electrodes separated from each other with the intermediary of a certain number of electrodes is executed by the differential amplifier 104. In the detailed position detection operation B in this step S114, the same processing operation as the detailed position detection operation A is carried out except for that differential amplification processing between adjacent two electrodes is executed, to thereby detect the position of the stylus pen 50 over the sensor surface 10S.

In this case, in this detailed position detection operation B, as shown in FIG. 11, the position of the stylus pen 50 is detected from the ratio of the signal levels of the signal output from the differential amplifier 104 in the respective cases of seven pairs (S1 to S7) although detailed calculation expressions are omitted.

Next, the microprocessor 110 detects the intensity of the signal from the stylus pen 50 on the basis of the digital signal d from the AD conversion circuit 108 and determines whether or not the height of the stylus pen 50 is equal to or lower than the height H1 set as the threshold for determining the state of proximity to the sensor surface 10S (step S117).

If it is determined in this step S117 that the height of the stylus pen 50 is not equal to or lower than H1, the microprocessor 110 returns the processing to the step S109 and repeats the processing of the detailed position detection operation A in this step S109 and the processing of the subsequent steps.

If it is determined in this step S117 that the height of the stylus pen 50 is equal to or lower than H1, the microprocessor 110 returns the processing to the step S114 and repeats the processing of the detailed position detection operation B in this step S114 and the processing of the subsequent steps.

Second Embodiment

In the above-described first embodiment, when the height of the stylus pen 50 becomes equal to or lower than the height H1 close to the sensor surface 10S, the X-selection circuit 101 and the Y-selection circuit 102 connect one electrode of two electrodes adjacent to each other to the positive-side input terminal of the differential amplifier 104 and connect the other electrode to the negative-side input terminal of the differential amplifier 104 without a determination as to whether or not the stylus pen 50 is in contact with the sensor surface 10S. However, the following configuration may be employed. Specifically, the position detecting device detects the contact of the stylus pen 50 with the sensor surface 10S. When the state of the stylus pen 50 becomes the state of being in contact with the sensor surface 10S, the position detecting device carries out control to cause the X-selection circuit 101 and the Y-selection circuit 102 to connect one electrode of adjacent two electrodes to the positive-side input terminal of the differential amplifier 104 and connect the other electrode to the negative-side input terminal of the differential amplifier 104.

As described above, the stylus pen 50 includes the writing pressure detector that detects the writing pressure applied to the core body 51 from the sensor surface of the position detecting sensor 10 and always includes writing pressure information detected by the writing pressure detector in a transmission signal to the position detecting device. The writing pressure information exhibits no change until the stylus pen 50 receives a pressure from the sensor surface 10S, and changes when the stylus pen 50 comes into contact with the sensor surface 10S and receives a writing pressure. Therefore, the microprocessor 110 of the position detecting device can detect contact of the stylus pen 50 with the sensor surface 10S easily and surely from the writing pressure information received from the stylus pen 50.

Therefore, in this second embodiment, when the height H of the stylus pen 50 satisfies a relationship of 0<H, i.e., when the stylus pen 50 is in a hover state, in which it is not in contact with the sensor surface 10S, the microprocessor 110 of the position detecting device carries out control to cause the X-selection circuit 101 or the Y-selection circuit 102 to select two electrodes separated from each other with the intermediary of n electrodes and carries out the detailed position detection operation A as shown in FIG. 10A. When the height H of the stylus pen 50 is H=0, i.e., the contact of the stylus pen 50 with the sensor surface 10S is detected, the microprocessor 110 carries out control to cause the X-selection circuit 101 or the Y-selection circuit 102 to select two electrodes adjacent to each other and carries out the detailed position detection operation B as shown in FIG. 10B.

Also in this second embodiment, an operation of detecting whether or not the stylus pen 50 exists can be carried out when the height H of the stylus pen 50 satisfies a relationship of H>H2 as with the above-described first embodiment. In this case, when the height H of the stylus pen 50 satisfies a relationship of 0<H≤H2, the microprocessor 110 carries out control to cause the X-selection circuit 101 or the Y-selection circuit 102 to select two electrodes separated from each other with the intermediary of n electrodes and carries out the detailed position detection operation A as shown in FIG. 10A. When the relationship of H>H2 is satisfied, the microprocessor 110 carries out electrode selection control like that shown in FIGS. 8 and 9 and carries out the operation of detecting whether or not the stylus pen 50 exists as with the above-described embodiment.

Effects of Embodiments

Regarding the above-described embodiments, the configurations of FIGS. 8 and 9 employ predetermined electrode selection patterns defined by employing, as a unit of electrode selection, each of a plurality of divided regions formed by dividing the sensor region of the sensor surface into plural regions. The configurations of FIGS. 10A and 10B employ predetermined electrode selection patterns defined by employing, as a unit of electrode selection, the electrodes disposed in the sensor region of the sensor surface.

Specifically, in FIG. 8, when the stylus pen is in a hover state in which it is comparatively far away from the sensor surface 10S, all of plural electrodes disposed in each of the divided regions formed by dividing the whole region of the sensor surface into plural regions are joined. In addition, the configuration is made so that the plural electrodes disposed in one divided region are connected to the positive-side input terminal of the differential amplifier 104 and the plural electrodes disposed in the other divided region are connected to the negative-side input terminal of the differential amplifier 104. This allows easy detection of the existence of the stylus pen in the hover state over the sensor surface and which divided region the stylus pen exists over.

In FIG. 9, the position detecting device has a configuration in which, when the stylus pen is in a hover state in which it is comparatively far away from the sensor surface 10S, all of plural electrodes disposed in each of divided regions formed by dividing the whole region of the sensor surface into plural regions are joined and selectively connected to the positive-side input terminal or the negative-side input terminal of the differential amplifier 104. In FIG. 9, when 10Aa (X-electrodes: X1 to X10), 10Ab (X-electrodes: X11 to X20), 10Ba (X-electrodes: X21 to X30), and 10Bb (X-electrodes: X31 to X40) are defined as a first divided region, a second divided region, a third divided region, and a fourth divided region, respectively, a configuration is made so that the respective electrodes disposed in both end divided regions (10Aa and 10Bb) among the four divided regions are connected to one input terminal of the differential amplifier 104 and the respective electrodes disposed in the center-part divided regions (10Ab and 10Ba) among the four divided regions are connected to the other input terminal of the differential amplifier 104.

In the case of the electrode selection pattern shown in FIG. 8, if the stylus pen exists at a part between the X-electrodes X20 and X21, which is the boundary part between the divided regions, a signal having the same signal level is input to each of the input terminals of the differential amplifier 104 and thus it is impossible to detect the existence of the stylus pen. In contrast, in the electrode selection pattern shown in FIG. 9, the X-electrodes X20 and X21 are included in the same divided region and therefore the inconvenience in the electrode selection pattern shown in FIG. 8 does not occur. However, also in FIG. 9, if the stylus pen exists at the boundary part between divided regions adjacent to each other, possibly a similar inconvenience occurs in detection of the stylus pen. However, such a situation can be avoided, e.g., by alternately implementing the electrode selection pattern shown in FIG. 8 and the electrode selection pattern shown in FIG. 9, i.e., by applying plural electrode selection patterns.

In FIG. 9, it is also possible to repeatedly carry out the following electrode selection pattern control. Specifically, the respective electrodes disposed in the first divided region are connected to one input terminal of the differential amplifier 104 and the respective electrodes disposed in the second divided region adjacent to the first divided region are connected to the other input terminal of the differential amplifier 104. In this state, differential amplification processing is executed. Next, the divided regions that should be selected are each moved by one or plural regions. That is, the second divided region and the third divided region adjacent to the second divided region are selected, or the third divided region and the fourth divided region adjacent to this third divided region are selected. In this state, differential amplification processing is executed.

That is, all of plural electrodes disposed in each of divided regions formed by dividing the whole region of the sensor surface into n regions (n is an integer of n≥1). In addition, the electrodes disposed in each of the divided regions adjacent to each other are connected to one pair of input terminals of the differential amplifier 104 and the differential amplification processing is executed. As the one pair of divided regions sequentially selected for the differential amplification processing, one pair of divided regions disposed close to each other are selected among the plural divided regions (n) adjacent to each other and the differential amplification processing is executed. Next, the differential amplification processing is executed on one pair of divided regions composed of one divided region of the above-described one pair of divided regions and a newly-selected divided region adjacent to this one divided region. The electrode selection control by which the divided regions are selected in this manner is sequentially carried out. Alternatively, as the one pair of divided regions sequentially selected for the differential amplification processing, one pair of divided regions disposed close to each other are selected among the plural divided regions (n) adjacent to each other and the differential amplification processing is executed. Next, the differential amplification processing is executed on a newly-selected one pair of divided regions adjacent to the above-described one pair of divided regions. It is also possible to sequentially carry out the electrode selection control by which the divided regions are selected in this manner.

The electrode selection patterns shown in FIGS. 10A and 10B are generated so that the distance between the electrodes connected to the positive-side input terminal and the negative-side input terminal of the differential amplifier 104 is controlled corresponding to the height H of the stylus pen from the sensor surface 10S. Specifically, if the stylus pen is close to or in contact with the sensor surface 10S for example as shown in FIG. 10B (H≤H1), the electrode selection control is carried out so that one pair of electrodes adjacent to each other are connected to the positive-side input terminal and the negative-side input terminal of the differential amplifier 104.

On the other hand, if the height H of the stylus pen from the sensor surface 10S is a predetermined height from the sensor surface 10S for example as shown in FIG. 10A (H1<H≤H2), selection control of one pair of electrodes is carried out so that at least one electrode is disposed between the one pair of electrodes connected to the positive-side input terminal and the negative-side input terminal of the differential amplifier 104 in order to ensure a predetermined distance corresponding to the height H of the stylus pen from the sensor surface 105. That is, in the hover state, in which the stylus pen is not in contact with the sensor surface 10S, an electrode selection pattern composed of one pair of electrodes separated from each other by at least one electrode is applied as the electrodes connected to the positive-side input terminal and the negative-side input terminal of the differential amplifier 104. This makes it possible to receive the signal from the stylus pen by one terminal of the positive-side input terminal or the negative-side input terminal of the differential amplifier. Therefore, even when the position detecting device is affected by external noise attributed to the contact of a hand or finger, the position indicated by the stylus pen 50 can be favorably detected because a significant differential signal is output from the differential amplifier 104.

Moreover, when the stylus pen 50 is close to or in contact with the sensor surface 105, the electrodes connected to the positive-side input terminal and the negative-side input terminal of the differential amplifier 104 are electrodes adjacent to each other and thus it is possible to surely cancel external noise that enters from a hand or finger by executing differential amplification processing. Therefore, it is possible for the position detecting device to eliminate the influence of noise that enters from the hand or finger and favorably detect the position indicated by the stylus pen 50 even when the hand or finger is in contact with the sensor surface 10S.

Other Embodiments or Modification Examples

In the above-described first embodiment, as the operation of detecting whether the stylus pen 50 is disposed over the sensor surface 105, the sensor surface 10S is divided into plural regions and the detection step A and the detection step B are carried out. However, the operation of detecting whether or not the stylus pen 50 is disposed over the sensor surface 10S is not limited to only such processing operation.

Figure 17:
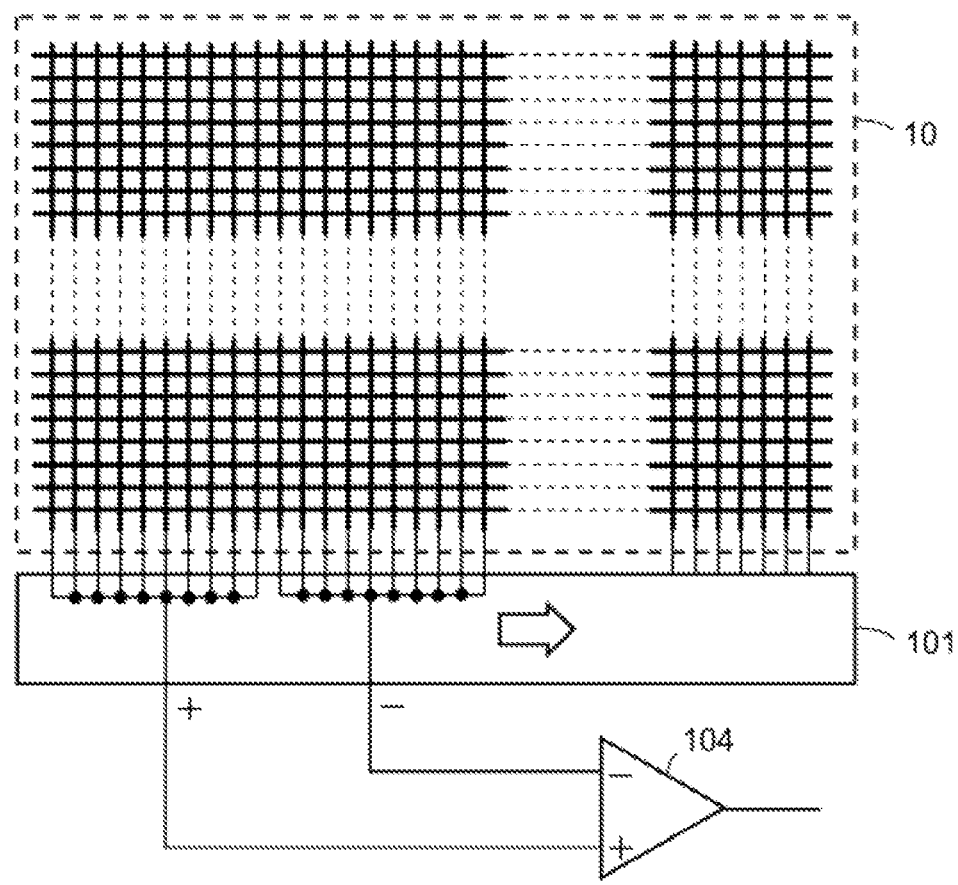
FIG. 17 is a diagram for explaining another example of a selection control of electrodes according to a position of a stylus pen in a height direction in a position detecting device according to an embodiment.

FIG. 17 shows another example of an operation of detecting whether or not the stylus pen 50 is disposed over the sensor surface 10S. This example of FIG. 17 shows the case of X-electrode selection control by the X-selection circuit 101. In this example, control is carried out so that electrodes in the left half of a selected region including electrodes in a predetermined number (here, 20) sufficiently larger than the number in the case of the detailed position detection operation A and B are connected to the positive-side input terminal of the differential amplifier 104 and electrodes in the right half of the selected region are connected to the negative-side input terminal of the differential amplifier 104. Then, the output level from the differential amplifier 104 is obtained while control is carried out to shift the selected region one electrode by one electrode. If the output level at this time becomes a significant level even once, the microprocessor 110 can detect the existence of the stylus pen 50 over the position detecting sensor 10.

In FIG. 17, the X-electrodes may be divided into plural regions in advance and processing may be so executed that selection of the electrodes connected to the positive-side input terminal and the negative-side input terminal of the differential amplifier 104 is updated in units of a divided region.

In the above-described embodiments, the height H1 (including H1=0) is set between the height H2 and the sensor surface 10S. However, heights may be set at plural stages and, according to the height, the interval between two electrodes connected to the positive-side input terminal and the negative-side input terminal of the differential amplifier 104 may be changed to a shorter distance when the stylus pen is brought closer to the sensor surface 10S. That is, the number n of electrodes intervening between the two electrodes may be set smaller non-linearly as the height becomes lower.

In the above-described embodiments, the position detecting sensor 10 detects a position indicated by the stylus pen 50. However, it is also possible that the position detecting sensor 10 is configured to detect even a position indicated by a finger. In this case, the position detecting device can be configured as shown in FIG. 3 in the above-described Patent Document 1 and detection of a position indicated by the stylus pen 50 and detection of a position indicated by a finger are carried out in a time-division manner.

In the position detecting sensor 10 of the above-described embodiments, the X-electrodes and the Y-electrodes are disposed to intersect with each other in both directions of the X-direction and the Y-direction. However, the position detecting sensor used for the position detecting device of the present disclosure may be one in which plural electrodes are disposed only in one of the X-direction and the Y-direction.

In the above-described embodiments, the stylus pen 50 transmits detected writing pressure information to the position detecting device by performing ASK modulation of an AC signal output from the oscillation circuit 58. However, the writing pressure information may be separately transmitted to the position detecting device by a near-distance wireless transmission circuit of, e.g., Bluetooth (registered trademark).

The detection circuit of the contact of the stylus pen 50 with the sensor surface 10S is not limited to one that uses the writing pressure information obtained by the writing pressure detector provided in the stylus pen 50. Besides it, various contact detectors can be used. Furthermore, this contact detector may be provided not only on the stylus pen side but on the position detecting device side.

In the detailed position detection operations A and B, the number of electrodes connected to each of the positive-side input terminal and the negative-side input terminal of the differential amplifier 104 is set to one. However, electrode selection control may be carried out by the X-selection circuit 101 or the Y-selection circuit 102 in such a manner that plural electrodes in the same number are connected to each of the positive-side input terminal and the negative-side input terminal of the differential amplifier 104.

In the first and second embodiments, in the detailed position detection operation B, two electrodes adjacent to each other are selected to be connected to the positive-side input terminal and the negative-side input terminal of the differential amplifier 104. In addition, signal level distribution like that shown in FIG. 11 is obtained as the signal level distribution of the detected signal when the selected electrodes are sequentially shifted and thereby a detailed indicated position is obtained. However, the electrodes selected in the detailed position detection operation B are not limited to two electrodes adjacent to each other. For example, in the detailed position detection operation B, it is also possible to carry out electrode selection control to make the intervention of one or plural electrodes between the selected electrodes. Also in this case, similar position detection can be carried out by obtaining the relationship between the position of the stylus pen and the signal level distribution in advance as shown in FIG. 11.

It is to be noted that the embodiments of the present disclosure are not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A position detecting device comprising:
    a sensor in which a plurality of electrodes is disposed in at least a first direction;
    a differential amplifier circuit that includes a first input terminal and a second input terminal and that outputs a differential signal based on signals supplied to the first input terminal and the second input terminal; and
    an electrode selection circuit that selects electrodes for connection to the first input terminal and the second input terminal of the differential amplifier circuit from the plurality of electrodes disposed in the sensor,
    wherein a position indicated by a stylus pen that generates an electric field based on electric field coupling between the stylus pen and the sensor is detected based on the differential signal output from the differential amplifier circuit, and wherein if the differential signal output from the differential amplifier circuit corresponding to a first electrode selection pattern set by the electrode selection circuit satisfies a set predetermined condition, a second electrode selection pattern different from the first electrode selection pattern is set by the electrode selection circuit to detect the position indicated by the stylus pen, wherein whether or not the set predetermined condition is satisfied is determined based on the differential signal that is generated corresponding to a height of the stylus pen in a height direction relative to a sensor surface of the sensor and is output from the differential amplifier circuit.

2. The position detecting device according to claim 1, wherein the position detecting device notifies an external device that a determination has been made that the stylus pen is disposed over the sensor surface of the sensor when the differential signal output corresponding to the first electrode selection pattern satisfies the predetermined condition.

3. The position detecting device according to claim 1, wherein the electrode selection circuit carries out electrode selection in such a manner that a first number of electrodes connected to the first input terminal of the differential amplifier circuit is the same as a second number of electrodes connected to the second input terminal of the differential amplifier circuit.

4. The position detecting device according to claim 1, wherein the second electrode selection pattern is a pattern formed by selecting a first electrode for connection to the first input terminal of the differential amplifier circuit and selecting a second electrode different from the first electrode for connection to the second input terminal of the differential amplifier circuit, and a distance between the first electrode and the second electrode is changed based on the differential signal output from the differential amplifier circuit.

5. The position detecting device according to claim 4, wherein the distance between the first electrode and the second electrode is changed based on the differential signal that is generated corresponding to a height of the stylus pen in a height direction relative to the sensor surface of the sensor and is output from the differential amplifier circuit.

6. The position detecting device according to claim 4, wherein the electrode selection circuit selects electrodes adjacent to each other for connection to the first input terminal and the second input terminal of the differential amplifier circuit in response to a determination that the stylus pen is close to a sensor surface of the sensor based on the differential signal output from the differential amplifier circuit.

7. The position detecting device according to claim 4, wherein the position detecting device detects a pressure applied from a sensor surface of the sensor to the stylus pen, and the electrode selection circuit selects electrodes adjacent to each other for connection to the first input terminal and the second input terminal of the differential amplifier circuit if the position detecting device detects that a predetermined pressure is applied to the stylus pen.

8. The position detecting device according to claim 1, wherein the electrode selection circuit sequentially changes the electrodes connected to respective ones of the first input terminal and the second input terminal of the differential amplifier circuit, and the position detecting device detects the position indicated by the stylus pen based on at least one of a distribution pattern of a signal level of the differential signal output from the differential amplifier circuit and the signal level.

9. A position detecting device comprising:
a sensor in which a plurality of electrodes is disposed in at least a first direction;
a differential amplifier circuit that includes a first input terminal and a second input terminal and that outputs a differential signal based on signals supplied to the first input terminal and the second input terminal; and
an electrode selection circuit that selects electrodes for connection to the first input terminal and the second input terminal of the differential amplifier circuit from the plurality of electrodes disposed in the sensor,
wherein a position indicated by a stylus pen that generates an electric field based on electric field couple between the stylus pen and the sensor is detected based on the differential signal output from the differential amplifier circuit, and
wherein if the differential signal output from the differential amplifier circuit corresponding to a first electrode selection pattern set by the electrode selection circuit satisfies a set predetermined condition, a second electrode selection pattern different from the first electrode selection pattern is set by the electrode selection circuit to detect the position indicated by the stylus pen,
wherein the first electrode selection pattern is a pattern formed by selecting a first predetermined number of electrodes in the sensor for connection to the first input terminal of the differential amplifier circuit and selecting a second predetermined number of electrodes in the sensor for connection to the second input terminal of the differential amplifier circuit.

10. The position detecting device according to claim 9, wherein the second predetermined number of electrodes is disposed on each of a first side and a second side of the first predetermined number of electrodes, with the first predetermined number of electrodes disposed in an intervening manner.

11. A position detecting method of a position detecting device including a sensor in which a plurality of electrodes is disposed in at least a first direction, a differential amplifier circuit that includes a first input terminal and a second input terminal and that outputs a differential signal based on signals supplied to the first input terminal and the second input terminal, and an electrode selection circuit that selects electrodes for connection to the first input terminal and the second input terminal of the differential amplifier circuit from the plurality of electrodes disposed in the sensor, the position detecting device detecting a position indicated by a stylus pen that generates an electric field based on electric field coupling between the stylus pen and the sensor based on the differential signal output from the differential amplifier circuit, the position detecting method comprising:
selecting a first electrode to connect to the first input terminal of the differential amplifier circuit; and
selecting a second electrode different from the first electrode to connect to the second input terminal of the differential amplifier circuit,
wherein a distance between the first electrode and the second electrode is changed based on the differential signal output from the differential amplifier circuit.

12. The position detecting method according to claim 11, wherein the distance between the first electrode and the second electrode is changed based on the differential signal that is generated corresponding to a height of the stylus pen in a height direction relative to a sensor surface of the sensor and is output from the differential amplifier circuit.

13. The position detecting method according to claim 11, wherein the electrode selection circuit selects electrodes adjacent to each other for connection to the first input terminal and the second input terminal of the differential amplifier circuit in response to a determination that the stylus pen is close to a sensor surface of the sensor based on the differential signal output from the differential amplifier circuit.

14. The position detecting method according to claim 11, further comprising:

wherein a pressure applied from a sensor surface of the sensor to the stylus pen detected, the electrode selection circuit selects electrodes adjacent to each other for connection to the first input terminal and the second input terminal of the differential amplifier circuit if a determination is made that a predetermined pressure is applied to the stylus pen.

\* \* \* \* \*